(12) United States Patent
McKenna et al.

(10) Patent No.: US 7,889,066 B2
(45) Date of Patent: *Feb. 15, 2011

(54) SELF-CONFIGURING EMERGENCY EVENT ALARM SYSTEM HAVING CONNECTION TO A PUBLIC SAFETY ANSWERING POINT

(75) Inventors: Daniel Bernard McKenna, Vail, CO (US); James Michael Graziano, Hotchkiss, CO (US)

(73) Assignee: SelfLink LLC, Vail, CO (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/165,042

(22) Filed: Jun. 30, 2008

(65) Prior Publication Data

US 2008/0309486 A1 Dec. 18, 2008

Related U.S. Application Data

(63) Continuation-in-part of application No. 11/872,005, filed on Oct. 13, 2007, now Pat. No. 7,504,937, which is a continuation of application No. 11/231,400, filed on Sep. 20, 2005, now Pat. No. 7,301,455.

(51) Int. Cl.
*G08B 29/00* (2006.01)
(52) U.S. Cl. .................. 340/506; 340/540; 340/539.16
(58) Field of Classification Search .............. 340/506, 340/540, 539.16–539.19, 870.03, 870.16, 340/521; 700/108
See application file for complete search history.

(56) References Cited

U.S. PATENT DOCUMENTS

| | | | |
|---|---|---|---|
| 5,960,341 A * | 9/1999 | LeBlanc et al. ........... 340/995.1 |
| 6,437,692 B1 | 8/2002 | Petite et al. |
| 6,987,448 B2 | 1/2006 | Catton et al. |
| 7,053,770 B2 | 5/2006 | Ratiu et al. |
| 7,091,902 B2 | 8/2006 | Liu et al. |
| 7,113,090 B1 | 9/2006 | Saylor et al. |
| 7,145,467 B2 | 12/2006 | Abel et al. |
| 7,187,279 B2 | 3/2007 | Chung |
| 7,301,455 B2 * | 11/2007 | McKenna et al. ........... 340/540 |
| 7,504,937 B2 * | 3/2009 | McKenna et al. ........... 340/506 |

* cited by examiner

*Primary Examiner*—John A Tweel, Jr.
(74) *Attorney, Agent, or Firm*—Patton Boggs LLP

(57) ABSTRACT

The present Self-Configuring Alarm System uses a decentralized (ad hoc or mesh) architecture where any node is capable of autonomously reporting the alarm event directly to all other nodes in the ad hoc network independent of where the alarm event occurred. In addition, the Self-Configuring Alarm System includes a plurality of autonomous output devices which function to provide an audible alarm that directs the occupants to the location of the hazard and/or provides an indication of the nature of the detected hazard or whether an indication of the hazard has been received at a Public Safety Answering Point (PSAP) that serves the dwelling or locale. The alarm networks and output networks may not be coextensive in their coverage areas.

40 Claims, 11 Drawing Sheets

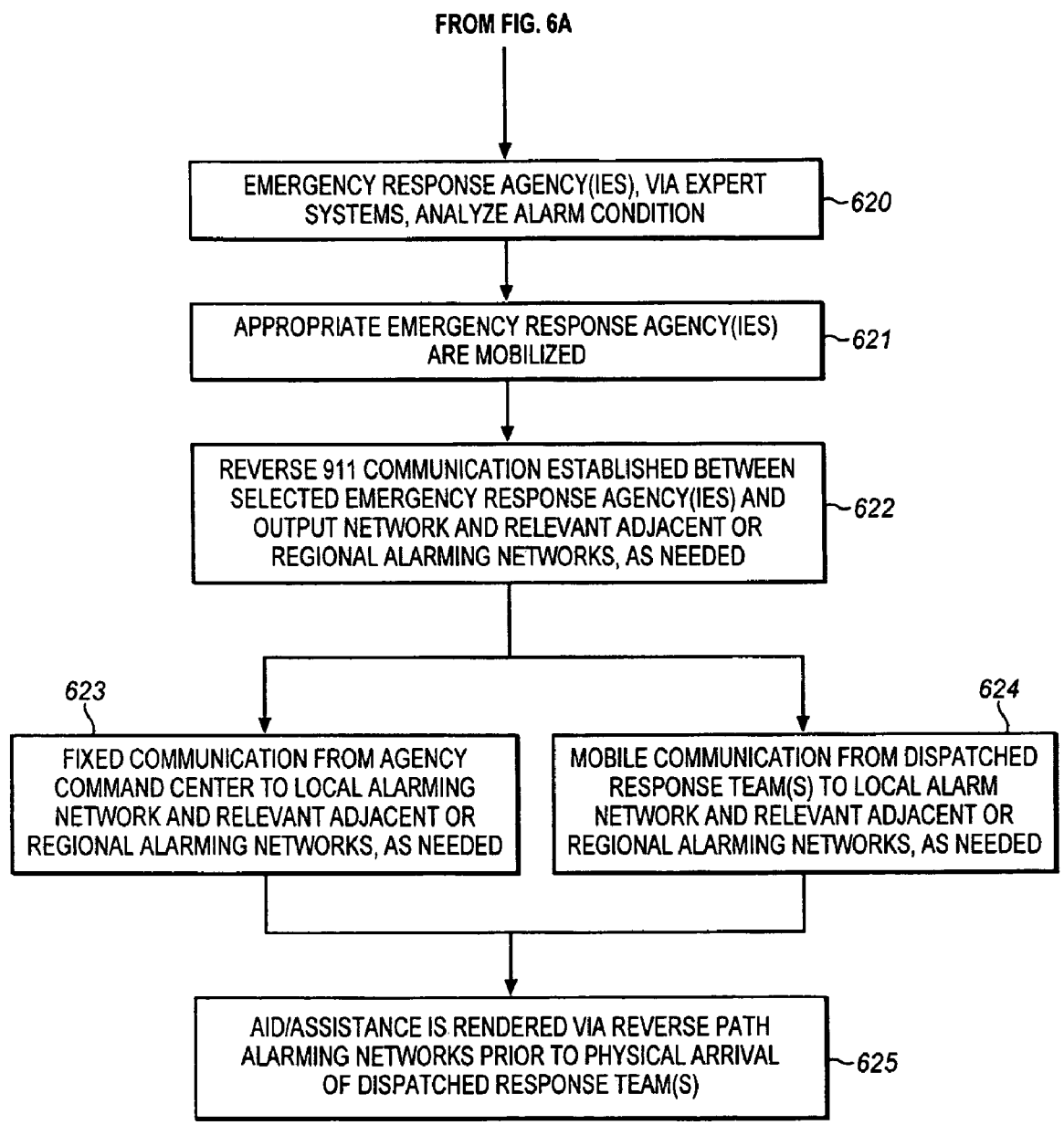

SELF-CONFIGURING EMERGENCY EVENT ALARM SYSTEM HAVING CONNECTION TO A PUBLIC SAFETY ANSWERING POINT

CROSS-REFERENCE TO RELATED APPLICATIONS

This Application is a continuation-in-part of U.S. patent application Ser. No. 11/872,005 filed Oct. 13, 2007, now U.S. Pat. No. 7,504,937, issued Mar. 17, 2009; which is a continuation of U.S. patent application Ser. No. 11/231,400 filed Sep. 20, 2005, now U.S. Pat. No. 7,301,455, issued Nov. 27, 2007. This application is also related to a U.S. Patent Application titled "Self-Configuring Emergency Event Alarm System With Autonomous Output Devices" filed on Jun. 30, 2008 as U.S. patent application Ser. No. 12/164,945 and incorporating the disclosure herein.

FIELD OF THE INVENTION

This invention relates to a self-configuring network of emergency event alarm devices that are sited in fixed locations and are used to identify the presence and locus of a hazard via the use of an associated network of autonomous output devices.

BACKGROUND OF THE INVENTION

It is a problem in the field of alarm devices that there are numerous hazards that can be threatening to the occupants of a dwelling or a predetermined locale, and existing hazard detection sensors are available to detect the presence of a predetermined level, concentration, or intensity of the hazard. In practice, autonomous alarm devices are located in fixed locations, for example, within a dwelling and respond to the incorporated hazard sensor to automatically generate an alarm indication, such as an audible alarm, to identify the presence of a hazard proximate to the alarm device. However, the audible alarm only alerts the occupants of the dwelling who are presently located proximate to the active autonomous alarm device. Alternatively, integrated home protection systems output an audible alarm via all alarm devices located in a dwelling, but without providing any indication of the locus or nature of the detected hazard. Therefore, existing alarm devices and systems are limited in their effectiveness in alerting occupants of a dwelling and/or providing an identification of the nature and locus of the detected hazard.

Present integrated home protection systems are pre-wired into a dwelling and typically function both as a burglar alarm system and a hazard detection system. These integrated home protection systems use a centralized architecture comprising a master-slave topology to manage a plurality of remotely located sensors and a plurality of remotely located alarm devices that are located in a dwelling. The master-slave topology has all of the remote (slave) sensors reporting alarm events to the central control unit which then responds by audibly alarming ALL remote alarm devices in the system and, if so designed, sending an alarm indication to an external agency, such as the local fire department. However, the integrated home protection systems fail to provide an audible alarm that directs the occupants to the location of the hazard or away from the hazard and/or provides an indication of the nature of the detected hazard or whether an indication of the hazard has been received at a Public Safety Answering Point (PSAP) that serves the dwelling, factory, office or school campus.

If an integrated home protection system is not installed in the dwelling at the time of construction or remodel, the remaining protective solution is to purchase and install multiple stand-alone autonomous alarms that are placed in different locations in the dwelling (garage, kitchen, bedrooms, and so on). However, these stand-alone alarms (fire, smoke, $CO_2$, natural gas), while alarming for an event in their immediate area, do not alert other areas of the dwelling of a potential danger. Therefore, the occupants of the dwelling may not hear the alarm, and in multiple family dwellings, the occupants of units other than the one containing the active alarm are not likely to hear the active alarm.

Thus, presently available stand-alone alarm devices (consumer purchasable devices) operate autonomously since they have neither a master-slave topology (since no master exists) nor do they have an ad hoc or mesh networking ability to communicate with other peer-like alarm devices. In particular, the lack of any peer-to-peer alarm device communication capability causes the alarm system to only "alarm" in the area of the alarm event. This lack of systemic alarming capability means that large portions of a dwelling are not alerted to a given hazardous event and provide limited effectiveness due to their autonomous mode of operation and their reliance on local audible alarms to perform the alerting function. In addition, these systems fail to provide the ability to receive communications from external sources in response to an alarm event, or provide output devices that are networked to cover a spatial area that may not be coextensive with the spatial area covered by the alarm devices.

Thus, there is a need for an emergency event alarm network that coordinates the operation of multiple alarm devices that are located throughout a dwelling or multiple units of a multi-family dwelling or a factory, or office or a school campus. In addition, there is a need for an emergency event alarm network that networks multiple alarm devices together without the need for extensive and expensive wiring to interconnect the alarm devices. Finally, there is a need for an emergency event alarm network that provides an audible indication that a report of the hazard has been received at a Public Safety Answering Point (PSAP) or private security agency or emergency responder organization that serves the dwelling, and that can provide an output in a spatial area that may not be coextensive with the spatial area covered by the alarm devices.

BRIEF SUMMARY OF THE INVENTION

The present Self-Configuring Emergency Event Alarm System Having Connection To A Public Safety Answering Point PSAP) (termed "Self-Configuring Alarm System" herein) solves the above-described problems by implementing two conceptually separate, yet cooperatively operative sub-networks: an Alarm Device Network and an Output Device Network. The Alarm Device Network of the present Self-Configuring Alarm System dynamically interconnects a set of individual emergency event alarm devices that are installed throughout a dwelling or the units of a multiple family dwelling, campus or other facility or at a predetermined locale as an ad hoc (or mesh) peer-to-peer network using a self-configuring network to effect the interconnection. The emergency event alarm devices (termed "alarm devices" herein) consist of one or more sensor elements for detecting the presence of a hazard, a processor element for executing a set of control logic, an alarm element for generating an alert indication, and a network element for communicating with other alarm devices in the alarm network. In addition, the Self-Configuring Alarm System connects with an Output Device Network which includes a plurality of autonomous output devices, which function to provide an audible alarm that directs the occupants to the location of the hazard and/or provides an indication of the nature of the detected hazard and/or whether an indication of the hazard has been received at a Public Safety Answering Point (PSAP) that serves the dwelling, campus, facility or locale. The Output Device Network can cover a spatial area that may or may not be coextensive with the spatial area covered by the Alarm Device Network.

The Self-Configuring Alarm System uses a decentralized (ad hoc or mesh) architecture for the Alarm Device Network, which does not have a centralized "master" node. In this ad hoc network, any node is capable of behaving as if it were the "master node" by autonomously reporting the alarm event directly to all other nodes in the ad hoc network independent of where the alarm event occurred and then acting as the "master node" by reporting the event, if so configured, to a Public Safety Answering Point (PSAP) or emergency response agency, such as the fire department or an alarm monitoring company. The network of alarm devices, therefore, can spread the alarm indication to the entirety of the area covered by the network of alarm devices and also can differentiate between a general alarm indication and the locus of the alarm event.

The Output Device Network interconnects a plurality of output devices, each of which generates human sensible alarm indications in response to the receipt of an alarm indication. The output devices can be integrated into the alarm devices or can consist of separate elements. The Output Device Network may not be coextensive with the Alarm Device Network, so that an alarm condition sensed at a particular location may not result in an alarm indication at that location (such as in the case of detecting an approaching wildfire), but would cause an alarm indication to be produced at the location(s) that would alert the human occupants of that area that is in danger. Thus, the Alarm Device Network and the Output Device Network are conceptually two separate networks, even though they may be the same physical network medium in whole or in part. These two networks are interconnected so that alarm indications can be passed from the Alarm Device Network to the Output Device Network and control signals can be passed in the reverse direction, as is described below.

Thus, an alarm in the garage, which potentially would not be heard, is now heard throughout the house. In addition, the garage alarm can produce a different alarm indication, as the alarm device detecting the hazard, than the remainder of the alarm devices in the Self-configuring Alarm System to thereby indicate the locus of the alarm event. This "different alarm indication" is propagated to the Output Device Network, where it is distributed and presented in a human sensible manner via the output devices. This different alarm indication can be a unique audible tone or it could be a synthesized or recorded voice prompt saying "garage" or "garage smoke" or it could be displayed as text on all of the Self-Configuring Alarm System's plurality of output devices. The Output Device Network can also receive and output communications which are communicated with a Public Safety Answering Point (PSAP) or emergency responders via the interconnection of the Self-Configuring Alarm System with one or more communication networks.

The connecting medium between the alarm devices and also among the output devices could be acoustic, electrically wired, Radio Frequency (RF), optical, power line carrier, or a combination of multiple technologies to enable redundancy and simple installation. The preferred connective embodiment of the Self-Configuring Alarm System is wireless or power line carrier since both are easily and immediately available to the non-expert, typical homeowner (by simply plugging in the alarm device to an electrical outlet as is commonly done today with stand-alone alarms). In addition, multiple communication links can be used to provide redundancy, such as using the power line carrier as well as radio frequency links to interconnect the alarm devices and output devices of the Self-Configuring Alarm System.

This network concept is not limited to a single family home but is extensible to other locations/uses. For example, in an apartment building, one apartment could alert the adjacent apartment that an alarm event is occurring. Similarly, shared industrial spaces could carry the alert across inter-company physical boundaries. Train cars could carry an alert back to the engineer in the locomotive. Dense urban centers with shopping on lower levels and habitable dwellings above could also be interconnected in a self-networked alarm system. Transient military operations that do not have a permanent base, such as in wartime, would now have cost-effective, transportable, and simply installed alarm system protective coverage. This architecture/system can also be used for public area emergencies or threats such as terrorist or bio-terrorism events by pre-deploying a Self-Configuring Alarm System with appropriate sensors for the expected threat. This system also could be instantly deployed after a public area emergency event has occurred to ensure that the event area does not expand to other adjacent regions or other cities.

Last, this system could be a redundant path alarm network for pre-installed wired alarm systems. Industries and applications where timely alerting with high reliability (low rate of alarm equipment failure) and high availability (high rate of alarm network up-time) greatly improves safe operation thereby benefiting from the application of wholly redundant alarm systems.

BRIEF DESCRIPTION OF THE DRAWINGS

FIG. 5A illustrates, in flow diagram form, the operation of the present Alarm Network, consisting of a plurality of alarm devices while FIGS. 6A and 6B illustrate, in flow diagram form, the operation of the present Self-Configuring Alarm System, consisting of a plurality of output devices, in generating alarm indications in response to the detection of a hazard condition wherein fixed and mobile emergency responders can communicate directly to the alarming site via the Output Network.

DETAILED DESCRIPTION OF THE INVENTION

Figure 1:
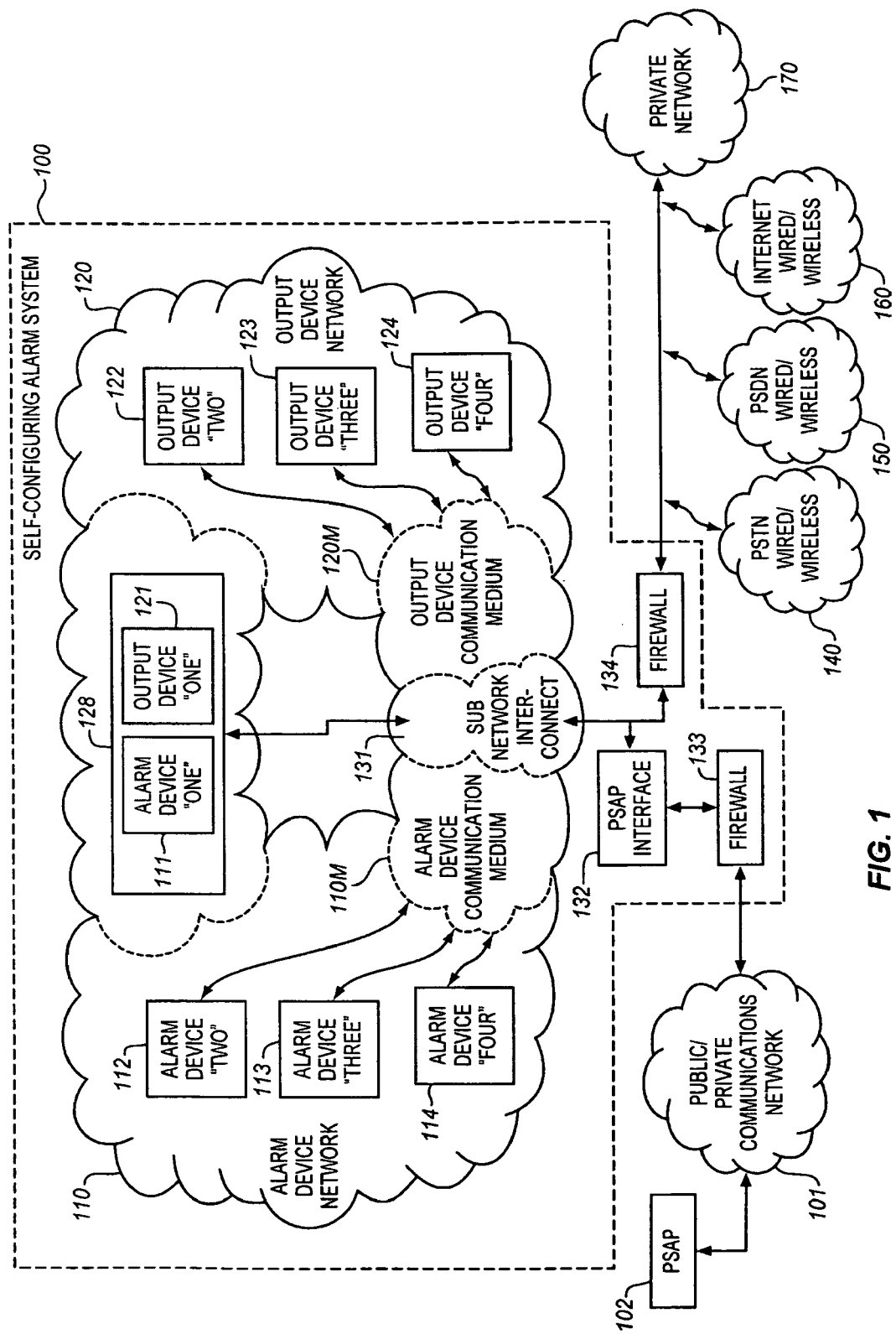
FIG. 1 illustrates, in block diagram form, the configuration of a typical installation of the present Self-Configuring Alarm System, consisting of a self-configuring sub-network of alarm devices, a sub-network of autonomous output devices, and the interconnection of these two sub-networks which are further connected to a Public Safety Answering Point (PSAP) via an external network and/or other external connections to various public network types.

There are numerous hazards that can be threatening to the occupants of a dwelling (to include but not limited to a factory, office or school campus) or those present in a predetermined locale, and autonomous alarm devices are available to detect the presence of a predetermined level, concentration, or intensity of the hazard and automatically generate an alarm indication, such as a loud sound, to alert the occupants in the vicinity of the alarm device of the presence of the hazard. The present Self-Configuring Alarm System 100, as shown in FIG. 1, includes two conceptually separate yet cooperatively operative sub-networks: an Alarm Device Network 110 and an Output Device Network 120. The Self-Configuring Alarm System 100 dynamically networks a set of individual alarm devices 111-114, which are installed throughout a dwelling or the units of a multiple family dwelling, campus, or other facility, into an ad hoc (or mesh) peer-to-peer network architecture, using a self-configuring network. Each node in the resulting Alarm Device Network "finds" its proximate neighbor nodes, which then communicate in a like fashion to their proximate neighbor nodes until a network is formed with end-to-end connectivity in its entirety. The Output Device Network 120 includes a plurality of output devices 121-124, which may or may not be coextensive with the set of individual alarm devices 111-114. Not unlike the Alarm Device Network 110, the Output Device Network 120 can also be self-configuring.

Self-Configuring Alarm System Architecture

FIG. 1 illustrates, in block diagram form, the configuration of a typical installation of the present Self-Configuring Alarm System 100, consisting of a self-configuring sub-network (Alarm Device Network 110) of alarm devices, a sub-network (Output Device Network 120) of autonomous output devices, and the interconnection of the respective communication mediums 110M and 120M of these two sub-networks by Sub-Network Interconnect 131. As noted above, the present Self-Configuring Alarm System 100 includes two conceptually separate, yet cooperatively operative sub-networks: an Alarm Device Network 110 and an Output Device Network 120. As shown in broad concept form in FIG. 1, these two networks, Alarm Device Network 110 and Output Device Network 120, may not be contiguous in that the networks are disjunct and their coverage areas are not overlapping. The Alarm Device Network 110 and Output Device Network 120 partially overlap in their respective coverage areas and also both networks include a shared dual-function device 128 as is described below. The Alarm Device Network 110 and Output Device Network 120 can be implemented using separate communication mediums 110M and 120M or can share a common communication medium, Sub-Network Interconnect 131. The physical coverage area of each of these networks can be coextensive, can be disjunct, or can overlap. One of the Alarm Network Devices shown in FIG. 1 is coextensive with one of the Output Network Devices and is represented by a shared device 128 formed by Alarm Device "One" 111 together with Output Device "One" 121. The alarm devices 111-114 of Alarm Device Network 110 cover a predetermined area and the alarm indications that are generated by these alarm devices 111-114 are transmitted to output devices 121-124 of the Output Device Network 120, which generate human sensible alarms in an area that may not include all of the area covered by the alarm devices 111-114. Human sensible alarms include any form detectable by humans to include, but are not limited to: audible, visual, vibration, and the like.

In some cases the coverage region of Alarm Device Network 110 and the coverage region of Output Device Network 120 are not coextensive, in that the coverage regions may be smaller, larger or different. Shown in FIG. 3B, examples include campus areas such as universities, where there can be numerous Alarm Device Networks 110A-110C and numerous Output Device Networks 120A-120C. If a chemical spill occurred on one end of a university, the alarm devices in Alarm Device Network 110A that serves this section of the university campus are activated, but the downwind sensors in the alarm devices in Alarm Device Networks 110B and 110C have not yet detected the spill. But, it is clear that an alarm condition should be sent to the entire university. The Alarm Device Network 110A of alarm devices, respond in the proximal area of the spill. Then Alarm Device Network 110A communicates with Output Device Networks 120A-120C, which activate their output devices to annunciate the presence of a potential hazard across the entire university campus' geographical area. In this case, the active extents of Alarm Device Network 110A and Output Device Networks 120A-120C are different. Similarly, a large office building or apartment complex or shopping mall could have different active extents of Alarm Device Networks 110A-110C and Output Device Networks 120A-120C.

The Self-Configuring Alarm System 100 can include a Sub-Network Interconnect 131 which serves to provide communication interfaces to the communication mediums 110M and 120M of both Alarm Device Network 110 and Output Device Network 120 to enable data to be transmitted therebetween. The Sub-Network Interconnect 131 can be as simple as using a common communication medium, but implementing an addressing scheme where the messages among the alarm devices 111-114 use an address space that differs from the address space used by the output devices 121-124. Network Interconnect 131 also serves to bridge communication mediums 110M and 120M with the external world. In addition, a Public Safety Answering Point Interface (PSAP) 132 (which can also be part of an alarm device vs. a stand-alone central device to the entire Self-Configuring Alarm System) interconnects the Alarm Device Network 110 with one or more Public/Private Communication Networks 101. The Public Safety Answering Point Interface (PSAP) 132 can include a firewall to protect the Self-Configuring Alarm System 100 from access by unauthorized outsiders. The PSAP Interface 132 communicates through a Firewall 133 which is often a software application. Firewall 133 could also be a physical device running firewall software. Going further, Firewalls 133 and 134 could be the same software application, albeit logically partitioned to access unique and different external connection points. Alternatively, the firewalls could reside directly in the Alarm and Output Devices themselves; although, from a cost perspective, this may not be the most efficient systems-level approach. Separately, Firewall 134 connects with external networks 140, 150, 160 and 170. An example of this external network connectivity could be an internet connection 160 that serves to warn a given individual of a low temperature reading in their second home on a lake in Minnesota. Alternatively, the Firewall 134 could connect with PSDN network 150 to send an alert to a Forest Service Ranger that a forest fire has started at a given latitude and longitude. Last, PSAP 102 can provide a reverse path communication via Firewall 133 and PSAP Interface 132 thru Sub-Network Interconnect 131 to Output Device communication medium 120M finally to the output devices 121-124 of Output Device Network 120. This could take the form of emergency responders directly and actively modifying or enhancing the warning message, of whatever form, being annunciated by the Output Alarm Network 120.

Alarm Device

Figure 2A:
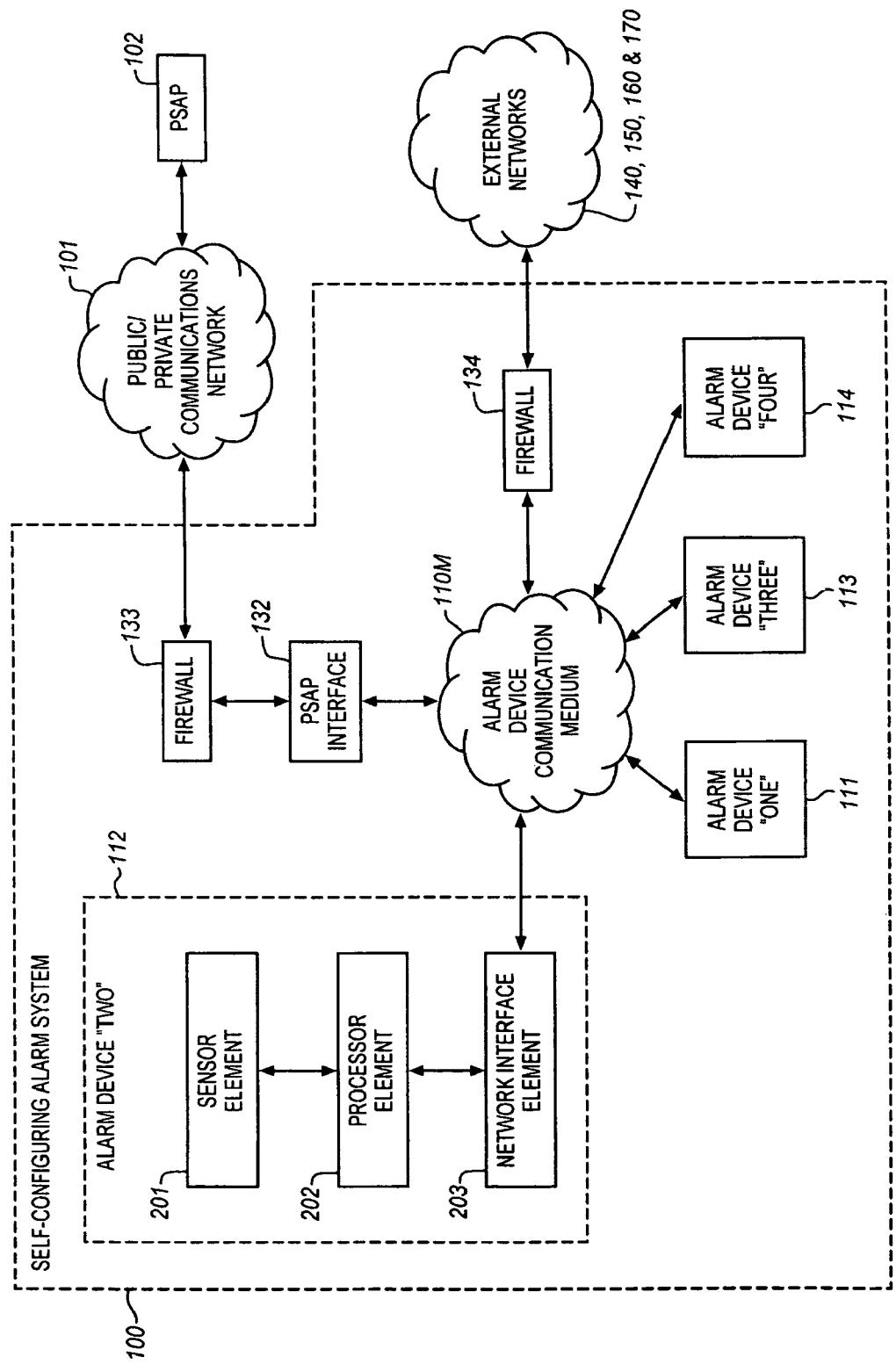
FIG. 2A illustrates, in block diagram form, the architecture of a typical alarm device.

FIG. 2A illustrates, in block diagram form, the architecture of a typical alarm device 112, which consists of sensor element(s) 201, processor element 202, and network interface element 203. The sensor element 201 functions to detect the immediate presence of a hazard, which can be one or more of: fire, heat, carbon monoxide gas, natural gas, smoke, propane, hazardous gas, chemical, bio-hazard, nuclear hazard, intrusion or other such life-endangering event. The sensor element 201 typically generates an output electrical or optical signal (in an explosive environment) indicative of the status of the monitored life-endangering event, either safe or unsafe. The processor element 202 includes the power source used to power the alarm device 111 and a backup (where used), as well as the program controlled device that activates and executes the logic of the alarm device 112. This logic monitors the output electrical signal received from sensor element 201, the presence/absence of power, and functions to control the network interface element 203 based on the state of the sensor element 201, as well as the presence of other alarm devices 111, 113-114 as described below.

Processor element 202 not only manages the sensor element(s) 201, but also manages the network interface element 203 to determine whether one or more other alarm devices is present within a self-determined communication range of the alarm device 112, as described below. In addition, the processor element 202 recognizes a unique identity that is assigned to this alarm device 112, either prearranged in the factory, or set by the installer of the Self-Configuring Alarm System 100 or established by an automatic self configuring process. The assignment of a unique identity to alarm devices simplifies the self-configuration process as described below, since each response to a communication is associated with a particular uniquely identified alarm device, to thereby distinguish among a plurality of alarm devices that may respond to a query. Further, the unique identity or address is essential to later map an alarming event to a particular location when the Alarm Devices are installed.

Network interface element 203 consists of a communication device which functions to establish a communication session with one or more other alarm devices 111, 113-114 via a communication medium 110M. The communication medium 110M can be any of the known types, including: power line carrier, wireless (radio frequency), acoustic, ultrasonic, optical, wired or the like. The preferred communication medium 110M is wire-line, wireless or a combination of thereof. For example, the network interface element 203, when the alarm device 112 is installed and initiated, transmits a query over the available communication medium 110M to detect the presence of any other alarm devices 111, 113-114 that are connected to the communication medium 110M. This is described below with respect to FIG. 4, where Alarm network communication medium 110M serves to connect with the Output Network communication medium 120M wherein the Output Devices self-communicate via output device communication medium 120M, of the Output Device Network 120. The communication mediums 110M and 120Ms also serve to connect the alarm devices 111-114 and output devices 121-124 to the outside world that is to networks external to the Alarm and Output Networks themselves, via Sub-Network Interconnect 131.

Figure 3A:
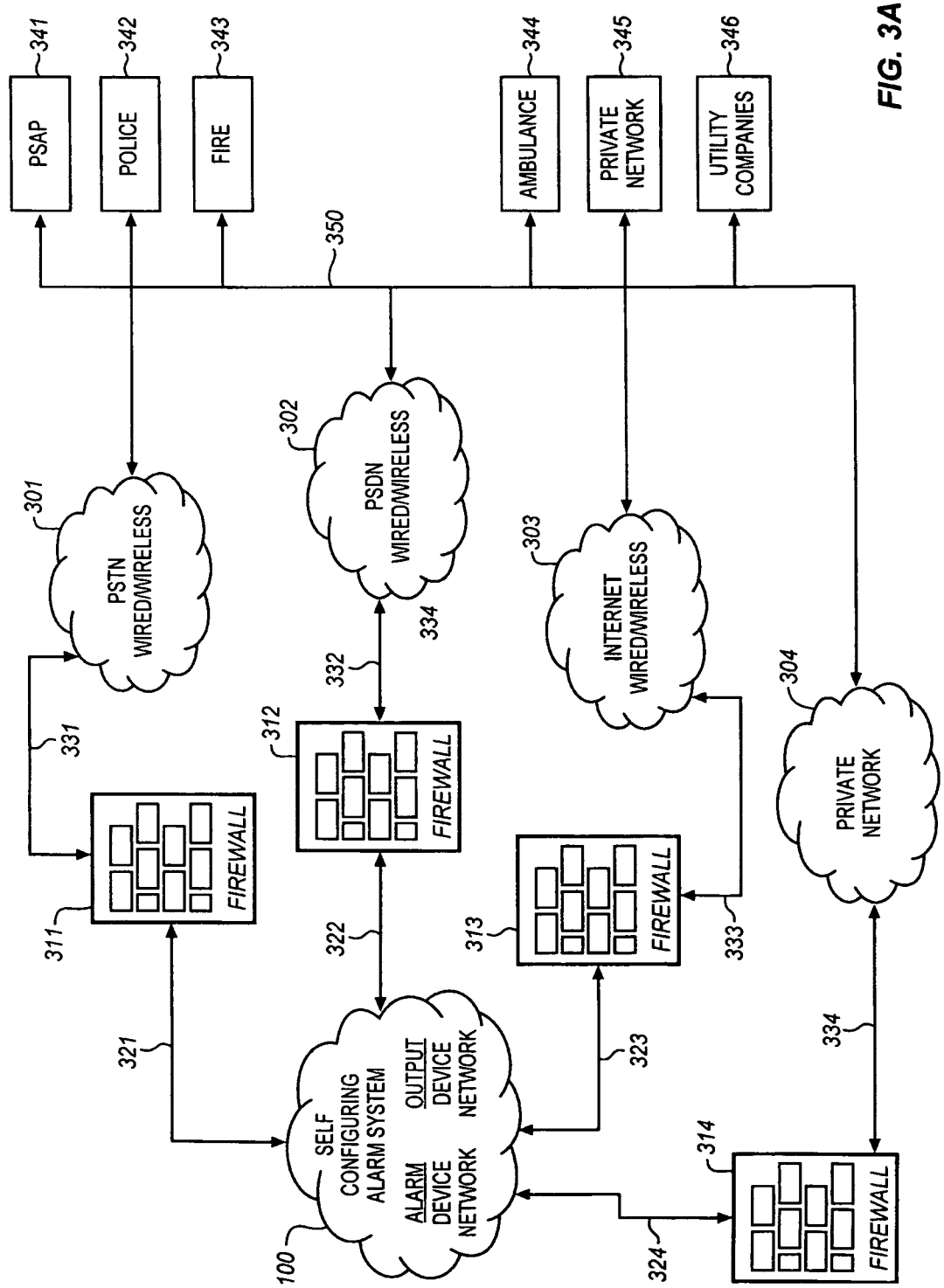
FIGS. 3A and 3B illustrate the inter-connection between the present Self Configuring Alarm Network and public networks and the inter-connection between multiple Self Configuring Alarm Network and public networks, respectively.
Figure 3B:
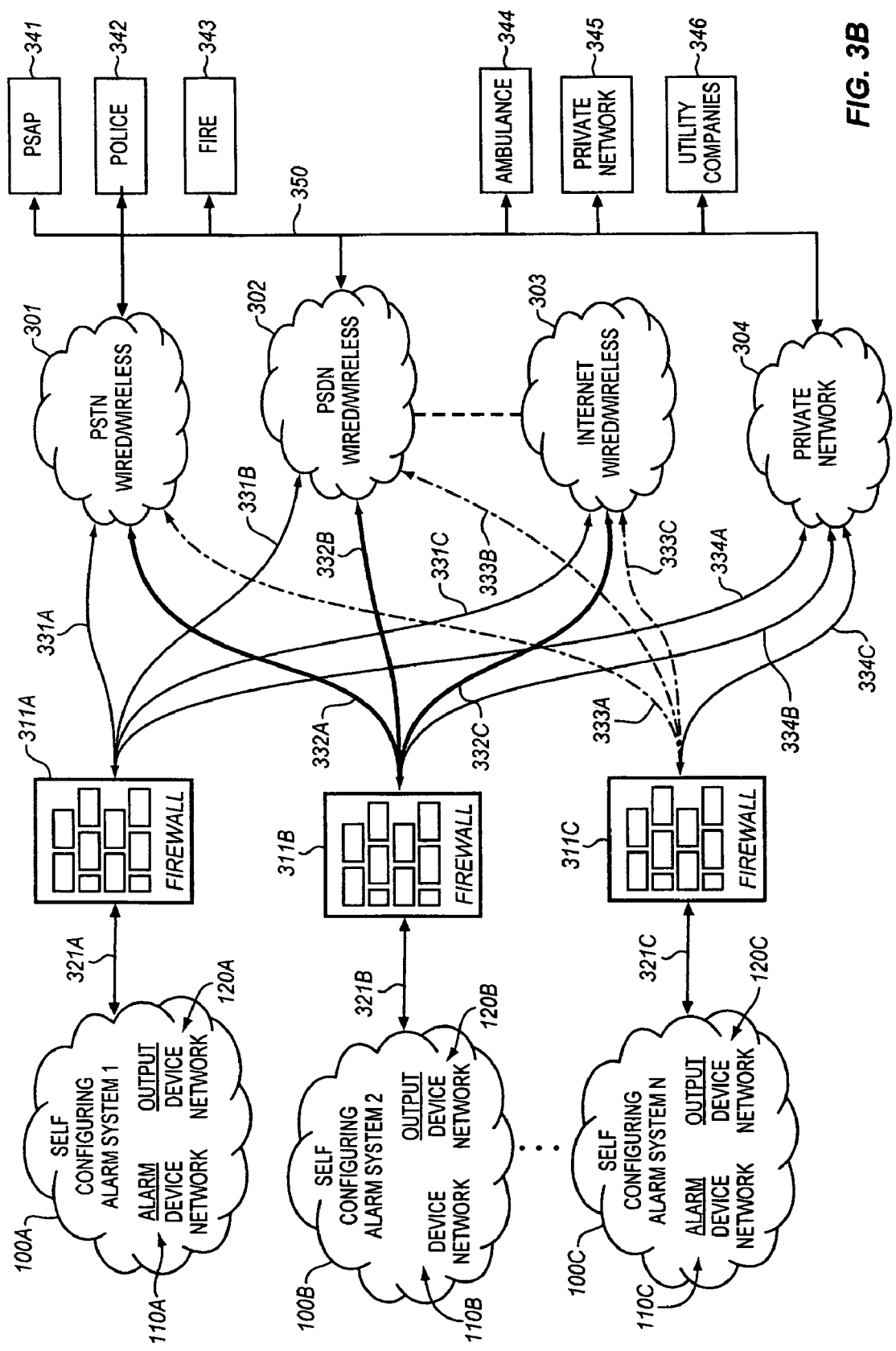

In addition, the alarm device 112 is connected via Network Interface 203 and Alarm Device communication medium 110M to PSAP Interface 132. The PSAP Interface 132 communicates to external network Public/Private Communication Network 101 via Firewall 133. The Public/Private Communication Network 101 can take the form of any type of communication architecture and is not limited in its form. Public/Private Communication Network 101 then connects to Public Safety Answering Point (PSAP) 102. Public/Private Communication Network 101 is also shown in FIGS. 3A and 3B. The Public Safety Answering Point (PSAP) 102 serves to establish a communication connection via a commercially available communication network 101, such as the Public Switched Telephone Network (PSTN) 301, Internet 303, Public Switched Data Network (PDSN) 302, or a private network 304, with a destination external to the Self-Configuring Alarm System 100. This destination can be a Public Safety Answering Point (PSAP) 341, Law Enforcement 342, Fire Department 343, Ambulance 344, Utility Companies 346, Private Security Agencies 345 and the like. A separate external network communication pathway not involving the PSAP occurs via Alarm Device communication medium 110M thru Firewall 134 to External Networks 140, 150, 160 and 170 (see FIG. 1 for a description of these external networks).

Thus, the alarm device 112 is capable of alerting the entire set of individual alarm devices 111, 113-114 of any alarm event, independent of where the alarm event occurred. The network of alarm devices, therefore, can spread the alarm indication to the entirety of the area covered by the network of alarm devices and also can differentiate between a general alarm indication and the locus of the alarm event. In addition, the alarm indication can be forwarded to agencies external to the Self-Configuring Alarm System 100.

Output Device

Figure 2B:
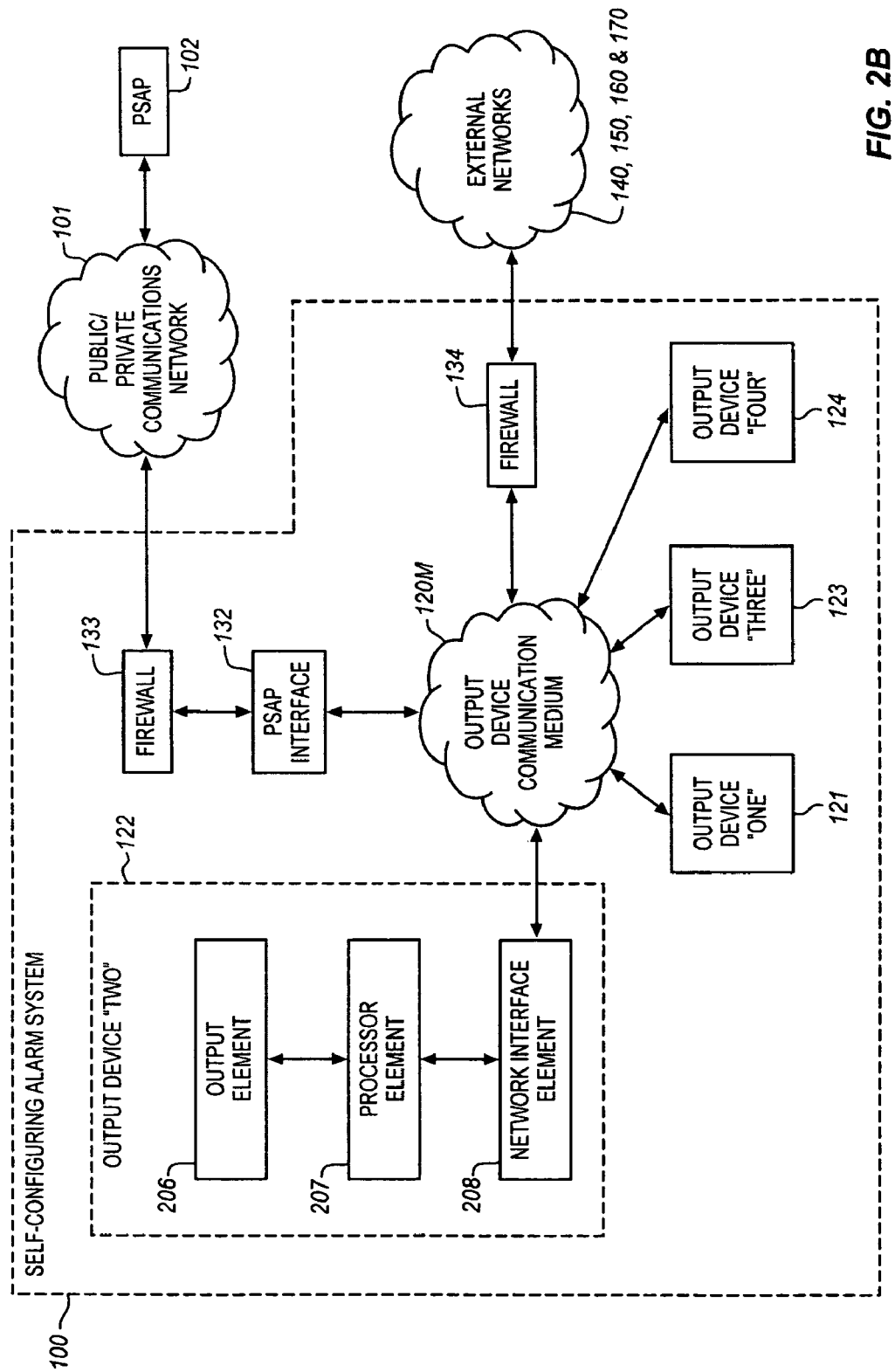
FIG. 2B depicts a typical output device and FIG. 2C shows a typical combined alarm/output device.

FIG. 2B depicts the Output Device 122, which is logically very similar to the Alarm Device. The Sensor Element 201 has been replaced with Output Element(s) 206, which is connected to Processor Element 207, which further connects to Network Interface Element 208. The Output Device communication medium 120M serves to interconnect all of the Output Devices 121-124 via wireless, wired, optical or other means. Network Interface Element 208 enables external network connections and communication medium 120M creates two inter-network paths, the first to external networks 140, 150, 160 and 170 via Firewall 134 and the second via PSAP Interface 132 thru Firewall 133 to Public/Private Communication Network 101 to PSAP 102. The typical communication flow in this case is an "external to internal" direction where the outside world communicates back to the Output Devices 121-124, conveying additional information that is timely for alarm annunciation by the Output Device Network 120. An example could be a bio-hazard event where emergency responders and other information sources convey additional information back to the Output Device Network 120; information that the Output Device Network 120 could not have "known" thru its own resources and connectivity to the Alarm Device Network 110. Separately, Output Device communication medium 120M provides for bi-directional intra-network communication to communication medium 110M to link Output Devices 121-124 with Alarm Devices 111-114 (see FIG. 1).

Figure 2C:
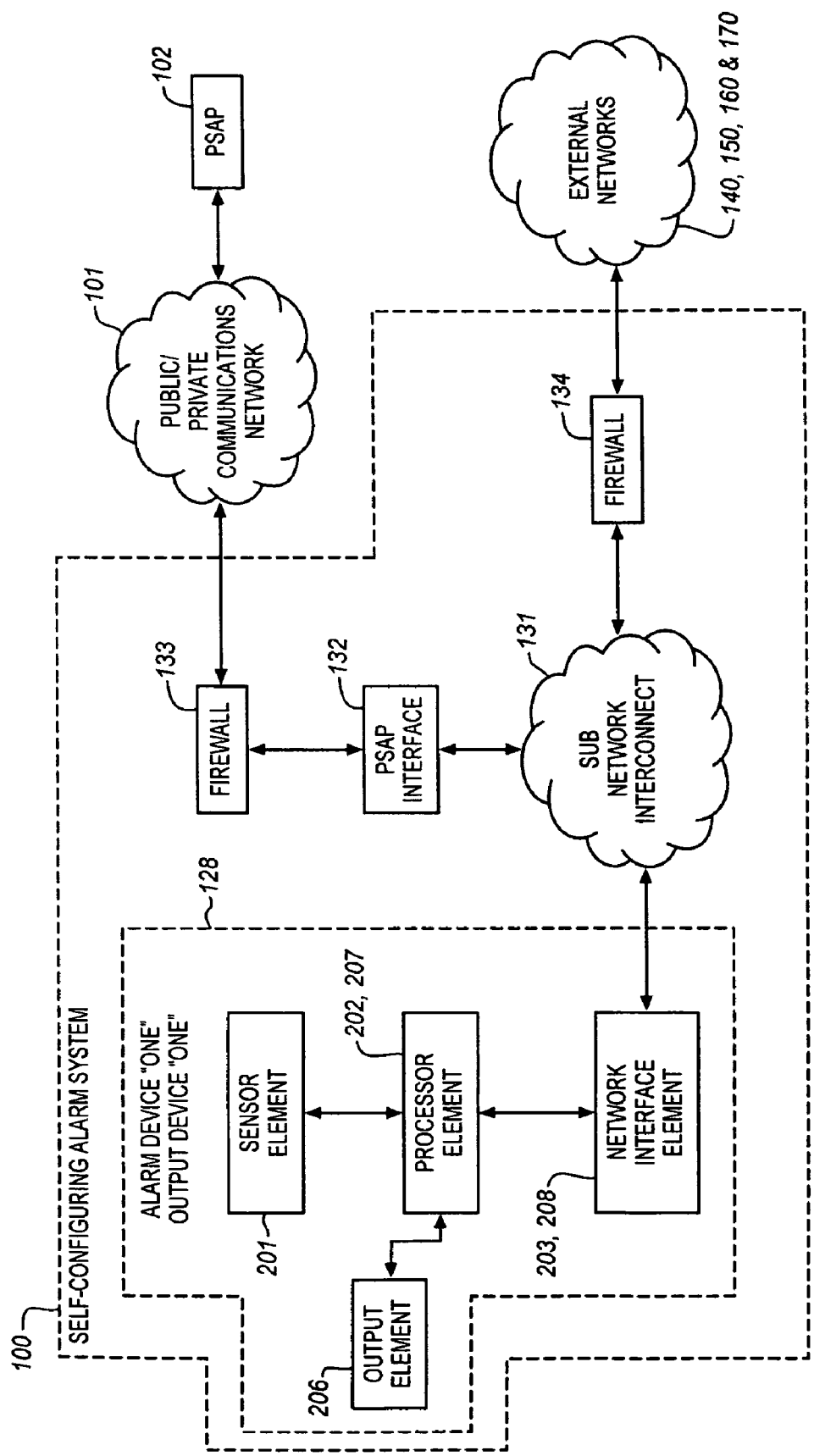

FIG. 2C illustrates an integrated device 128 which is created by combining Alarm Device 111 with Output Device 121 into the same physical package. An example of a combined device, albeit without communication capability, would be a home alarm product which is also capable of annunciating the localized alarm condition. However, the difference between the home alarm product with the integrated device 128 herein is that the integrated device 128 is communicating with two different device networks, Output Device Network 120 and Alarm Device Network 110 via the respective communication mediums 110M and 120M. The home alarm product also does not have intra-network communication capability via Sub-Network Interconnect 131. The sensor element 201 is similar to that in FIG. 2A as is the Output Element 206 in FIG. 2B. The processor functions are combined at element 202 and 207; in a similar fashion the Network Interface Elements are combined at 203 and 208. The external connectivity to the PSAP 102 and External Networks 140-170 is similar to that described for FIGS. 2A and 2B.

Self-Configuring Alarm System Functionality

FIG. 1 illustrates, in block diagram form, the configuration of a typical installation of the present Self-Configuring Alarm System 100, consisting of a plurality (N) of alarm devices 111-114 and consisting of a plurality (N) of output devices 121-124. Each of the alarm devices or nodes 111-114 is a self-configuring device capable of sensing a hazard and also optionally having resident communication capability. Likewise, the output devices or nodes 121-124 are self configuring devices capable of annunciating the presence of a hazard event. Alarm devices 111-114 form Alarm Device Network 110. Output devices 121-124 form Output Device Network 120. Alarm Device Network 110 is created using various linkages between and amongst the alarm devices 111-114 ranging from wireless to optical to wired, or any combination thereof. Similarly, the Output Device Network 120 is created using various linkages between and amongst the output devices 121-124 ranging from wireless to optical to wired, or any combination thereof. This Self-Configuring Alarm System 100 has a plurality of the following attributes:

1. Locate, identify and communicate with adjacent alarm devices (nodes). Perform a similar process for the output devices (nodes).
2. Perform a network registration of alarm devices in an autonomous, automatic manner. In a like fashion, perform the same steps for the output devices.
3. Authenticate alarm devices (nodes) on the network to ensure they are legitimate devices. Authenticate output devices to insure they are legitimate.
4. For both alarm and output networks, establish regular "all is well" internal communications to verify network health.
5. For both alarm and output networks, establish self-test algorithms in order to verify network functionality.
6. Relay data from one alarm device to the next alarm device if out of communication range. In a similar fashion, create a relay architecture for the output devices.
7. Alarm at multiple output devices, even though an alarm event can be highly localized. Establish intelligent output algorithms to respond to given alarm events.
8. Identify which alarm device is the alarming one so emergency personnel can respond accordingly.
9. Shut-off non-event alarm devices through user selection.
10. Shut off event output device(s) so that the event (fire, smoke, gas, other) can be more effectively managed.
11. Automatically alert fire, police, and ambulance to reduce response time.
12. Quickly discern false alarms from real events.
13. Change tone-tenor of audible alarm outputs by the output devices based on severity or threat of detected event (i.e., if it's a natural gas leak, have a specific alarm sound so that no one turns on a light switch).
14. Connect to external networks as needed. Connect to the PSAP as needed.
15. Enable feedback processes from the external networks and the PSAP to both the alarm sub-network and the output sub-network.

Network Topologies

There are numerous network topologies that can be used to implement the Self-Configuring Alarm System 100, and the following descriptions characterize a number of commonly used topologies. The description also characterizes a number of varieties of communication links that can be used to link the alarm devices regardless of the network topology selected.

Point-to-point links are often referred to as a "wireless bridge" when wireless, such as Radio Frequency, optical, or acoustic—herein collectively termed "wireless", communication links are used and serve as a replacement for a single communication cable. Point-to-point wireless links communicate reliably provided the two endpoints are located sufficiently close to one another to overcome the effects of interference and path loss. When not wireless, one disadvantage of a wired point-point topology is that wired and power line communication links require the use of wires which can be costly. And, a wired architecture could be impossible in an after-construction installation. In addition, wires can fail during a hazard condition such as a fire or an earthquake.

A mesh network is a local area network (LAN) that employs one of two connection arrangements: full mesh topology or partial mesh topology. In the full mesh topology, each alarm device is connected directly to each of the others. In the partial mesh topology, some alarm devices are connected to all the others, but some of the alarm devices are connected only to those other alarm devices with which they exchange the most data. The mesh network topology is a peer-to-peer system where an alarm device can send and receive messages, but each alarm device also functions as a router and can relay messages for its neighbors. Through this relaying process, a packet of data finds its way to its ultimate destination, passing through intermediate alarm devices with reliable communication links. If an alarm device fails in this network, the messages are automatically routed through alternative paths. A mesh network is also called an ad hoc network.

A mesh network is self-configuring and does not require manual configuration. Also, it is inherently reliable and adaptable, since if one router fails, messages are sent via alternate paths to their destination. Therefore, there is a significant amount of redundancy in the transmission capability of the mesh network, and the network is indefinitely scalable. A mesh network is reliable and offers redundancy. If one alarm device can no longer operate, all the rest can still communicate with each other, directly or through one or more intermediate alarm devices. Similarly true for output devices. Mesh networks work well when the alarm devices or output devices are located at scattered points that do not lie near a common line.

The chief drawback of the wired mesh topology is communication link expense, because of the large number of cables and connections required when a wire-line communication link paradigm is selected. However, with power line carrier communication links which are likely already in place or wireless communication links, the expense of interconnection is eliminated.

A star network is a local area network in which all alarm devices are directly connected to a common central node. Every alarm device is indirectly connected to every other through the central node. In some star networks, the central node can also operate as an alarm device. The star network topology works well when alarm devices are at scattered points. It is easy to add or remove alarm devices, provided the communication links are wireless. In a star network, a cable failure isolates the alarm device that it links to the central node, but only that alarm device is isolated. All the other alarm devices continue to function normally, except that they are not able to communicate with the isolated alarm device. If any alarm device goes down, none of the other alarm devices are affected. However, if the central node goes down in a star network, the entire network suffers degraded performance or complete failure.

The communication links can be implemented using any of a number of technologies. As noted above, the communication links can either be "wired" using power line carriers, electrical conductors, and the like, or 'wireless,' such as Radio Frequency, optical, acoustic, and the like. Some of these choices are described below.

For a power line carrier communication link embodiment, the typical architecture of the commercial alternating current (AC) power distribution network for a premises is that a plurality of low voltage power line transformers function to reduce the medium voltage of the power transmission lines to a low voltage of typically 220 volts for residential or business use. The next tier in this distribution network is the distribution of the low voltage from the power line transformer through an electric meter and service entrance disconnect to the in-building electrical outlets. At the circuit breaker panel that serves the premises, all of the neutral conductors are connected to a common bus bar, thereby electrically interconnecting all neutral terminals of all electrical outlets in the premises. This forms a "wired network" of conductors and their associated power outlet terminals that are distributed throughout the premises (often at 120 volts). The insertion of the communication signals into this power distribution network can occur at any point and can be implemented by simply connecting to the power distribution network via an electrical plug. In order to channel data communications on the power distribution network to selected locations and subscribers, apparatus typically is used to limit the signal distribution. Some of the existing components of the power distribution network automatically perform this function, such as power line transformers noted above. If the distribution of the communication signals encompasses a wider extent, the power line transformers can be bypassed by a high frequency jumper to carry the communication signals between power distribution networks. In addition, where a direct power line connection extends both to sites to be served as well as sites not to be served, some high frequency signal blocking apparatus is preferably used to limit the distribution of the data communication signals to only those sites to be served (transformers often act as blocks to Power Line Carrier (PLC) signals since their high frequency impedance is very high incurring substantial loss of the PLC signals across the transformer).

The radio frequency communication link embodiment uses RF transceivers (transmitter and receiver) modules in the alarm device(s) to effect communication between the networked nodes. This RF communication could be at any frequency of operation, although it is generally performed at VHF/UHF or microwave frequencies. A typical frequency band of operation is the Part 15 unlicensed spectrum, since this does not require FCC operating permits. Part 15 band operation has both un-spread and spread spectrum communication signals. The spread spectrum signals have the advantage of being non-interfering to adjacent spread spectrum networks. The spreading could be accomplished in either the code or frequency domain. Network access typically uses a Carrier Sense (CS) algorithm before transmitting to avoid uncoordinated packet collisions. Coupled with Carrier Sense, the communication access often uses an Aloha scheme (random, slotted, and so on) to further improve the network efficiency and minimize the likelihood of packet collisions in the RF domain.

Output Devices and Output Device Network

The Output Device Network 120 consists of a plurality of output devices 121-124 which annunciate alarm conditions to serve as a warning to human occupants, workers and students, for example. The output devices 121-124 in the Output Device Network 120 can be configured in the same manner as the alarm devices 111-114 are configured in the Alarm Device Network 110, as described herein. Alternatively, the output devices 121-124 can be viewed as being more passive in their operation, and can simply be installed in a manner that enables them to forward hazard detection indications and received emergency responder communications to other output devices in the Output Device Network 120. In any case, the Output Device Network 120 is autonomous in that it operates in a manner that is defined for its unique function and this may differ from the mode of operation of the Alarm Device Network 110.

FIG. 2B illustrates, in block diagram form, the architecture of a typical output device 122, which functions to generate one or more alarm indications comprising: an audible output of predetermined volume, duration, and pattern, a visual indication, tactile output (for the visually/audibly impaired) and/or external communication to an outside location. In addition, the output device 122 (FIG. 2B) can annunciate expert guidance which is received from emergency services personnel at a Public Safety Answering Point (PSAP) 102 (FIG. 2B). In FIG. 3A the PSAP 341 can directly deliver expert guidance back to the Output Device Network 100 or, in addition, emergency responding services 342-346 communicate back to the Output Device Network 120 via an extensible external network connection, as described below. In FIG. 2B, the output device 122 consists of output element(s) 206 which further has an audible output generator and a visual output generator, for example. Output device 122 in FIG. 2B also has a processor element 207 and a network interface element 208 for connecting to Output Device Network 120 via communication medium 120M. The audible out and visual output generators function to generate one or more alarm indications comprising: an audible output of predetermined volume, duration, and pattern, a visual indication, tactile output (for the visually/audibly impaired) and/or external communication to an outside location. The output element 206 typically receives an output electrical signal indicative of the status of the monitored life-endangering event, either safe or unsafe from the processor element 207. The output device 122 includes the power source used to power the output element 206 and also has a backup power source such as a battery (where used).

Processor element 207 not only manages the output element 206, but also manages the network interface element 208 to determine whether one or more other output devices are present within a self-determined communication range of the output device 122, as described below. In addition, the processor element 207 recognizes a unique identity that is assigned to this output device 122, either prearranged in the factory, or set by the installer of the Self-Configuring Alarm System 100 or established by an automatic self configuring process. The assignment of a unique identity to output devices simplifies the self-configuration process as described below, since each response to a communication is associated with a particular uniquely identified alarm device, to thereby distinguish among a plurality of output devices that may respond to a query.

Network interface element 208 consists of a communication device which functions to establish a communication session with one or more other output devices 121 and 123, 124 via a communication medium 120M. The communication medium 120M can be any of the known types, including: power line carrier, wireless (radio frequency), acoustic, ultrasonic, optical, wired, or the like. The preferred communication medium 120M is wire-line, wireless or a combination of these.

The Output Device Network 120 communicates with the Alarm Device Network 110 via communication mediums 120M and 110M, at Sub-network Interconnect, 131. The network interface element 208, when the output device 122 is installed and initiated, transmits a query over the available communication medium 120M to detect the presence of alarm devices 111-114 that are connected to the communication medium 120M via Sub-network Interconnect 131 to communication medium 110M thereby inter-connecting the Output Device Network 120 with the Alarm Device Network 110.

In addition, the output device 122 may optionally include a Public Safety Answering Point Interface Element or this can be a stand-alone Public Safety Answering Point Interface Element 132 as shown in FIG. 1 and in FIG. 2B, which is connected via a firewall element 133 (which can be internal to Public Safety Answering Point Interface Element 132) to one or more external public or private communication networks 101 as shown in FIGS. 1, 2B and 2C. The Public Safety Answering Point Interface Element 132 serves to establish a communication connection via a commercially available communication network 101, such as the Public Switched Telephone Network (PSTN). In addition, as shown in FIGS. 3A and 3B, element 132 (FIGS. 1, 2A, 2B and 2C) can be connected to Public Switched Telephone Network (PSTN) 301, Internet 303, Public Switched Data Network (PDSN) 302, or a private network 304, with a destination external to the Self-Configuring Alarm System 100. This destination can be a Public Safety Answering Point (PSAP) 341, Law Enforcement 342, Fire Department 343, Ambulance 344, Utility Companies 346, Private Security Agencies 345 and the like.

Emergency Services

Emergency Services access is an important feature of existing telecommunications networks, with the network being capable of not only identifying the subscriber, but also their present location to facilitate dispatching emergency services personnel. A universal code, such as 911 in North America and 112 in Europe, is used to access and dispatch emergency personnel from predefined sites termed "Public Safety Answering Points (PSAPs)". Enhanced 911 (E911) is an extension of this basic service and is defined by the transmission of callback number/IP address and geographical location information to the emergency dispatch personnel. The term "geographical location information" is used to refer to information about the physical position of a subscriber in the physical environment as opposed to a communications network address. For example, it comprises a civic address, postal address, street address, latitude and longitude information or geodetic location information. E911 may be implemented for landline and/or wireless devices. Voice-Over-Internet Protocol (VoIP) is a technology that emulates a phone call, but instead of using a circuit based system such as the telephone network, it utilizes packetized data transmission techniques most notably implemented in the Internet. Thus, in the existing telecommunications networks, there are a number of instances where the geographical location of the subscriber cannot be identified.

In order to promptly dispatch emergency service vehicles or other assistance to the correct destination, accurate information about the geographical location of the subscriber is needed. In conventional wire-line switched telephone networks, it is possible to provide the subscriber location information relatively easily because telephone handsets are fixed in particular locations. Static database entries can then be made in a database which is accessible to the emergency services personnel at the Public Safety Answering Points (PSAPs) to associate a subscriber's home address and telephone number. However, for mobile communication systems or the Internet, the use of such static database entries is not possible because the geographical location of a wireless communications device or the Internet accessing device is indeterminate.

Another problem concerns routing emergency calls to the correct destination. For regular calls this is not such an issue because the subscriber enters specific details of the required call destination. However, for emergency calls, the jurisdiction for emergency services answering points is typically quite small, for example, at the county level in the US. This information about the geographical location of the subscriber is needed to determine the routing of the call to the proper Public Safety Answering Point (PSAP). Misrouting of calls to the wrong answering point leads to costs in transferring calls, impacts reliability and leads to delays in dispatching emergency services personnel which are significant in life threatening situations.

It is anticipated that, in most cases, the annunciating device (output device 121) is co-resident with the alarm device 111 shown in FIG. 1. However, nothing herein prevents a stand alone annunciating output device which may have receive-only networking capability. Nothing herein restricts the output device network 120 from being receive-only; in fact, it is anticipated that the output device network 120 will have bi-directional, receive and transmit communication capability. Annunciation is ostensibly the act of performing machine to human-interface communication via various means: graphical, aural, visual, vibration, flashing lights, TV screen and other means not specifically stated herein. The annunciation device or output device could be fixed or portable or mobile in its extent. The purpose of annunciation is to provide a warning to personnel, homeowners, school children and so on. The annunciated warning could take various semantic forms but one common form would be to audibly annunciate "exit the premises in a calm manner".

In addition, annunciation can, through external network connectivity means, offer expert advice and guidance from emergency responders. This expert advice from an emergency responder could take the form of guidance on how to perform first aid to a burn victim; or, it could be how to perform CPR on someone who has smoke inhalation and isn't breathing. If the alarm event is non-machine generated via the autonomous alarm device sensors, that is the alarm is man-initiated, such as in the case of a poisoning, the emergency responders can provide live guidance on how to treat the poisoning victim, both from headquarters as well as from emergency responder vehicles (or via portable emergency personnel communication devices such as radios). This expert assistance could be outputted in the form of verbal instructions, or it could be displayed on a TV or computer screen, or some other helpful manner.

Network Architecture—Single Network—Alarm and Output Networks are Coextensive

FIG. 3A illustrates the inter-connection between Self-Configuring Alarm System 100 and public networks 301 (PSTN), 302 (PSDN), 303 (Internet) and private network 304. While not explicitly shown herein, private network connections could arise in large campus situations such as universities or large factories or chemical processing plants or refineries. The connections to private networks could be direct or they could be via public networks via a Virtual Private Network connection. In this architecture, each connection to an external network has a unique firewall 311-314. While not shown in FIG. 3A but shown in FIG. 3B, the firewall could be shared by all externally connected networks (which is likely the typical embodiment).

External networks, 301, 302, 303 and 304, provide connectivity to emergency services ranging from police 342 or fire 343 including but not limited to homeland security (not shown) or utility companies 346. This connectivity can be wired or wireless. It can take the form of fixed communications such as with a headquarter or regional command center or it could be mobile or portable such as in an ambulance or a hand held radio. Both mobile and fixed modes can be simultaneously in place and concurrently communicating. In addition, there is nothing to preclude a plurality of simultaneous and concurrent modes that involve wired/wireless means paired with fixed/mobile/portable means using concurrent/diverse/primary/secondary network means comprising 1 to N physical network types each communicating data/voice/visual information.

The Layer 2 and Layer 3 connection types can be circuit or packet switched however given the ubiquity of data networks, even those that carry voice communications, there is a strong likelihood that the connection type will often be packet in nature. In describing FIG. 3A, the stated embodiment highlights different connection attributes as a descriptive example. Nothing herein limits what is possible with this diverse architecture.

While these examples each used a single external network sub-type on a stand-alone fashion (for description clarity purposes only), as previously stated there is nothing to preclude a matrixed architecture wherein more than one external network type is concurrently active and responding to a given event.

Plurality of Alarm Device/Output Device Networks

FIG. 3B is an expansion of FIG. 3A and illustrates a plurality of Self-Configuring Alarm Systems 100A-100C. Each of these networks has coextensive Alarm Device Networks 110A-110C and Output Device Networks 120A-120C for the sake of example. They could be housed in the same physical device or be housed in different devices but if housed in different devices, they would be proximally located, as shown in this illustration. Another difference from FIG. 3A to FIG. 3B is the use of a singular firewall 311A-311C deployed as a sole firewall for plurality of external network connections. The functionality of this architecture is similar to FIG. 3A wherein each external network 301-304 has the ability to provide feedback via firewalls 311A-311C to a given Output Device Network 120A-120C to provide expert guidance, voice-data-visual, to the Output Device Network 120A-120C. The Self-Configuring Alarm System 100A-100C could even be on a mobile platform such as a car, ship, train or plane. It is anticipated that there are no fixed or mobile platform limitations with this invention.

Self-Configuring Alarm System 100A is connected via path 321A to firewall 311A which then connects via paths 331A, 332A, 333A, and 334A to external networks 301, 302, 303, and 304 respectively. Networks 301, 302, 303, and 304 are connected via multiple connection paths 350, which could be via wired or wireless, terrestrial or satellite, fixed or mobile or other means, to Public Safety Answering Point (PSAP) 341, Law Enforcement 342, Fire Department 343, Ambulance 344, Utility Companies 346, Private Security Agencies 345, and the like. The connection implementation is not a limitation of this invention nor is the communication protocol over such connection.

In a similar fashion, Self-Configuring Alarm System 100B connects via path 321B to firewall 311B which then connects via paths 331B, 332B, 333B, and 334B to external networks 301, 302, 303, and 304 respectively. Networks 301, 302, 303, and 304 are connected via multiple connection paths 350, which could be via wired or wireless, terrestrial or satellite, fixed or mobile or other means, to Public Safety Answering Point (PSAP) 341, Law Enforcement 342, Fire Department 343, Ambulance 344, Utility Companies 346, Private Security Agencies 345, and the like.

Last, Self-Configuring Alarm System 100C connects via path 321C to firewall 311C which then connects via paths 331C, 332C, 333C, and 334C to external networks 301, 302, 303, and 304 respectively. Networks 301, 302, 303, and 304 are connected via multiple connection paths 350, which could be via wired or wireless, terrestrial or satellite, fixed or mobile or other means, to Public Safety Answering Point (PSAP) 341, Law Enforcement 342, Fire Department 343, Ambulance 344, Utility Companies 346, Private Security Agencies 345, and the like.

Alarm Device and Output Device Networks are not Coextensive

Figure 4:
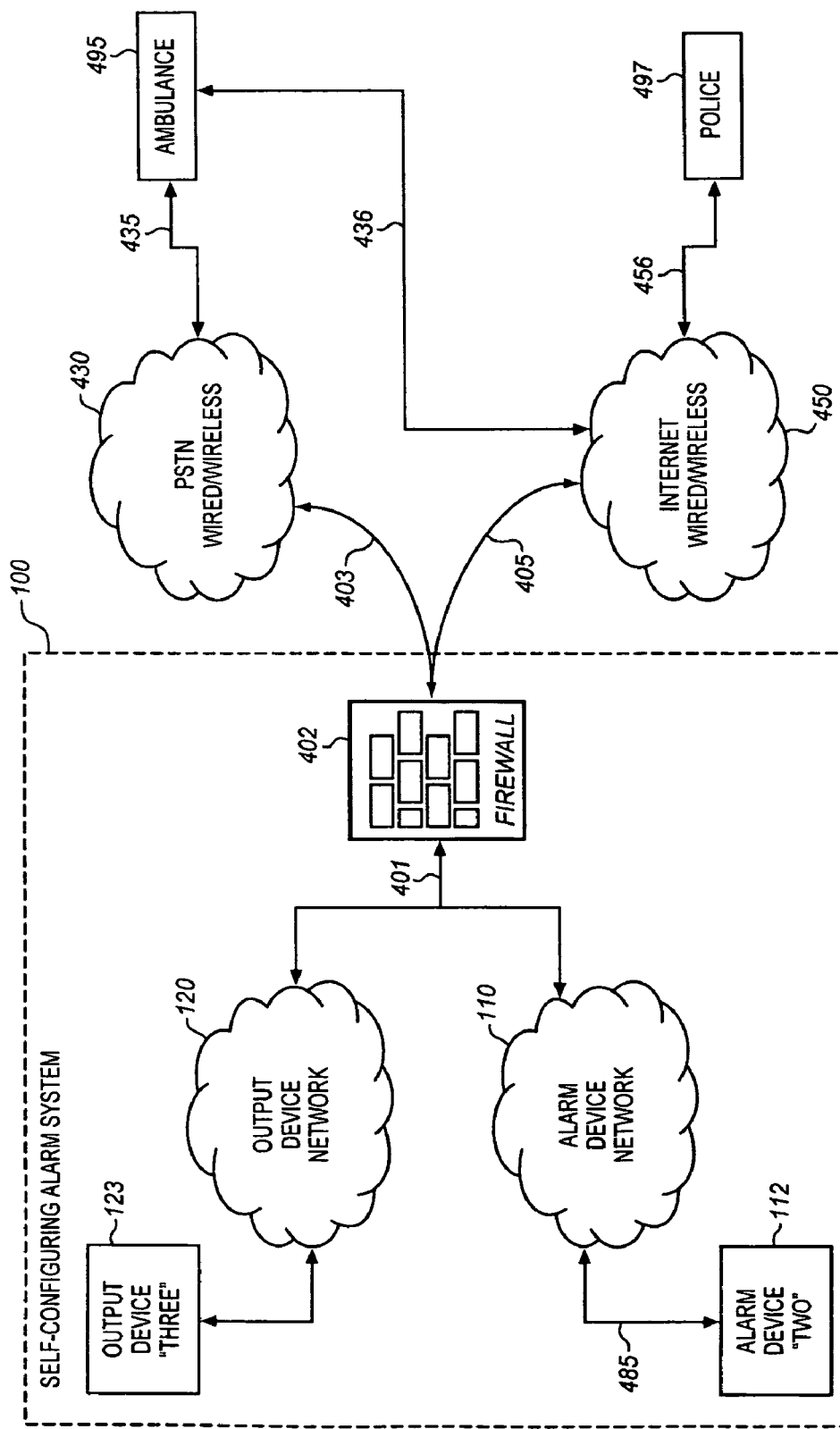
FIG. 4 illustrates an architecture where the Alarm Device Network component of the Self Configuring Alarm Network and the Output Device Network component of the Self-Configuring Alarm Network are not coextensive.

FIG. 4 differs from FIGS. 3A and 3B in that the Output Device Network 120 is not coextensive with the Alarm Device Network 110 in terms of the coverage area. In this depiction, Alarm Device "Two" 112 sends an alarm event indication to Alarm Device Network 110 via path 485. This alarm event indication is then sent via path 401 thru firewall 402 to external networks PSTN 430 and Internet 450. In this example, assume the alarm event is a hurricane which is affecting a large geographic area. The Self-Configuring Alarm System 100 is located on the coastal region but the emergency response is 10 miles inland. Upon hurricane onset, the alarm event, for example, triggers an ambulance and police response. In particular, while the number of connections and alarm output responses is numerous, for further clarity of discussion, in this example only the police vehicle 497 is providing communication feedback to area emergency responders. This feedback is carried via link 456 then via Internet 450 back to the local Output Device Network 120. Output Device Network 120, located 10 miles inland, is receiving voice bi-directional communication from the police vehicle 497 which is in motion and moving towards the scene. In addition, the Output Device Network 120 can forward this feedback via PSTN 430 to ambulance 495 via link 435. This early expert aid and assistance provides quick response by local civilians and to the ambulance 495 to deal with traumatic injuries.

Output Device Network 120 is also connected via Internet 450 and link 436 to ambulance 495. This connection is of a data nature, providing information on when the ambulance will be on scene, where it intends to go first and so on. There is virtually no limitation as to what kind of data can be sent. For instance, if alarm device 112 were man initiated such as someone is having a heart attack, the ambulance 495 could provide via the data link 436, explicit CPR instructions on the home TV via Internet 450; alternatively the CPR instructions could be displayed on a computer screen. And, the bi-directional voice link via PSTN 430 could provide coaching to keep the local responder calm and working on efficient CPR procedures prior to the ambulance's arrival.

Network Self-Configuration Process

Figure 5A:
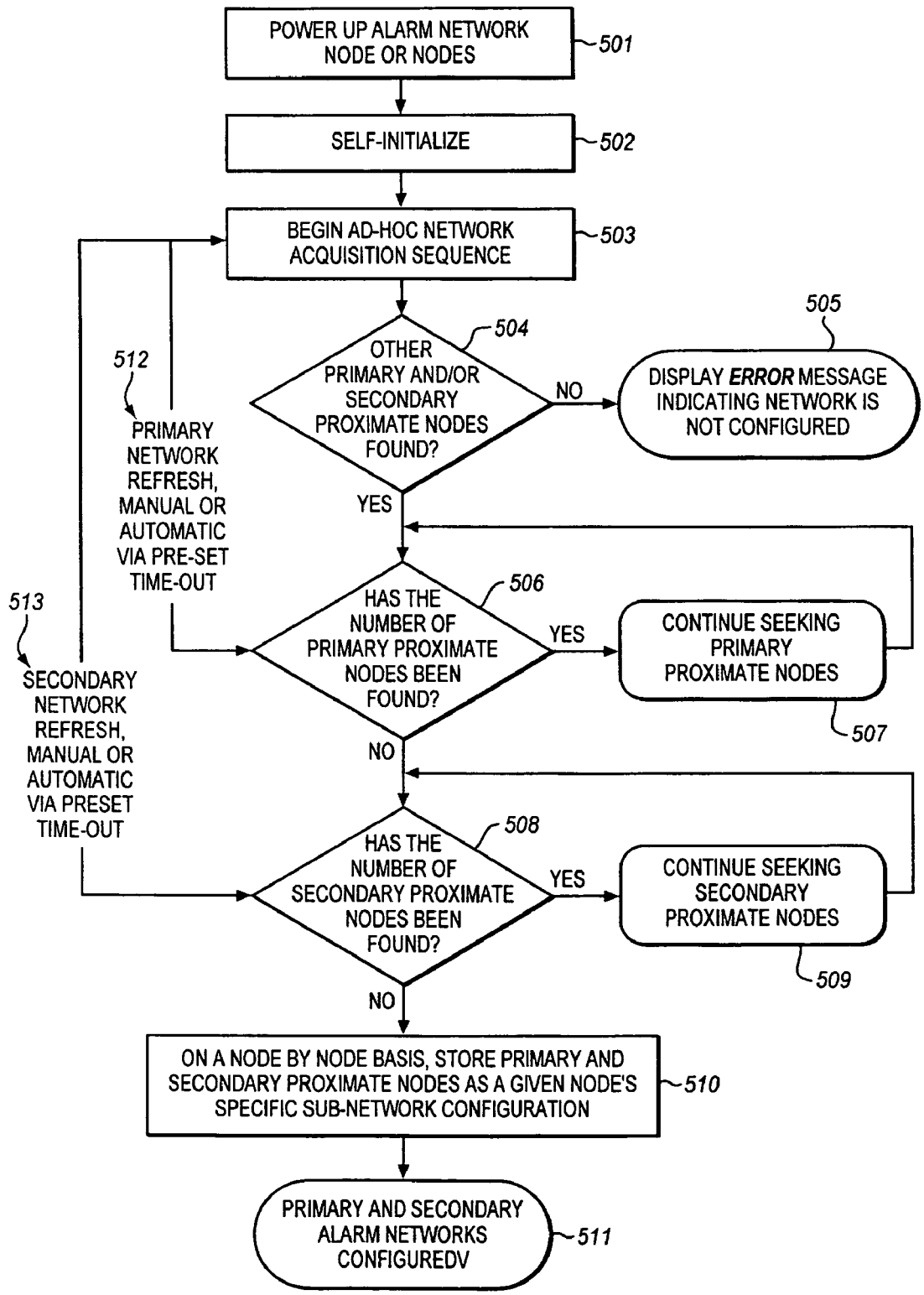

FIG. 5A illustrates, in flow diagram form, the operation of the present Self-Configuring Alarm System 100, consisting of a plurality of self-configuring emergency event alarm devices 111-114, such as is illustrated in FIG. 1 in the initial network self-configuration mode. The alarm devices 111-114 initially are in a power down mode, where each alarm device is not aware of other alarm devices located in proximity to the alarm device. The alarm devices 111-114 can either be assembled prior to installation in the dwelling or installed in the dwelling and awaiting activation.

The alarm network is initialized when the plurality of alarm devices 111-114 are powered up at step 501. Each alarm device 111-114 enters step 502 where they self-initialize and proceed to activate the various elements contained therein and verify the operational status of these elements. In addition, the alarm devices 111-114 identify the communication medium 110M that is used to implement the alarm network communication backbone. Identification of the type of communication medium used can be automatically detected, or may be manually set by the installer via a data input, such as a switch setting on the alarm device 111-114.

Once the alarm devices 111-114 are operational, the installer advances to step 503 where one of the alarm devices, for example—alarm device 114, is advanced into the network self-configuration mode. This process entails the selected alarm device 114 transmitting one or more messages over the communication medium 100M to establish communications with one or more of the remaining alarm devices 111-113. If, at step 504, the selected alarm device 114 fails to locate any other alarm devices, then this is an error condition, since the network must contain two or more alarm devices. Therefore, processing advances to step 505 where an error indication is generated to indicate that the network configuration has failed. The failure to find a proximate device to communicate with could simply be that, for example, the homeowner, through a mistake, hasn't turned on any of the other network nodes. To manage this situation, and to ensure that the network has a process whereby it refreshes its configuration, step 512 provides a Primary Network Refresh in a manual or automatic means. The Primary Network defines the volume or spatial extent of the homeowner's dwelling, for example.

Otherwise, at step 506, the selected alarm device 114 receives one or more responses to its transmitted query and stores the identity of the responding alarm device(s) in its memory. If this responding alarm device (111 for example) has not previously been detected by the selected alarm device 114, then the number of primary proximate nodes has changed and processing advances to step 507 where processing returns to step 506 where the next responsive response (from alarm device 113 for example) is received and analyzed as noted above. The steps 506-507 are repeated until all of the responses received by selected alarm device 114 have been processed. At this juncture, all of the alarm devices that are proximate to the selected alarm device 114 are identified and their identities stored in the memory of alarm device 114. The identified alarm devices that are proximate to and communicable with alarm device 114 form alarm device 114's sub-network within the composite mesh network 110. In a like manner, all individual alarm devices, 111-113 have their own sub-networks of alarm devices which are respectively communicable to themselves, respectively. This network configuration process continues in a like manner, serial or simultaneous in the time domain, for all alarm devices 111-114 interconnected by communication medium 110M.

Processing then advances to step 508 where the selected alarm device 114 receives one or more responses to its transmitted query from alarm devices located in the Secondary Network and stores the identity of the responding alarm device(s) in memory. The Secondary Network, for example, could be a neighbor's home network (it being a Primary Network for the neighbor) where the adjacent neighbors have mutually agreed to have their individual Primary Networks interconnected. If this responding alarm device (111 for example) has not previously been detected by the selected alarm device 114, then the number of secondary proximate nodes has changed and processing advances to step 509 where processing returns to step 508 where the next responsive response (from alarm device 113 for example) is received and analyzed as noted above. The steps 508-509 are repeated until all of responses received by selected alarm device 114 have been processed. At this juncture, all of the alarm devices that are proximate to the selected alarm device 114 and located in the secondary network are identified and their identities stored in the memory of alarm device 114. If no Secondary Network devices are initially located, step 513 provides for manual or automatic self configuration at a future time.

At step 510, the selected alarm device 114 completes the network definition table stored in memory to identify the alarm devices that are located in the primary sub-network and the secondary sub-network as seen from the selected alarm device 114. Processing then advances to step 511 where the selected alarm device 114 enters the alarm network configured state.

Each of the alarm devices, other than the selected alarm device 114, in response to receiving an initial query, activates itself to step 503 where it initiates the network self-configuration process. As part of this network self-configuration process, as alarm devices transmit and receive messages, each originating alarm device receives queries from one or more other alarm devices as these devices self-configure, and the receipt of such a query confirms that the initiation of the self-configuration or alarm process has been accomplished by the network. Once the network is configured, it is ready to respond to alarms.

Figure 5B:
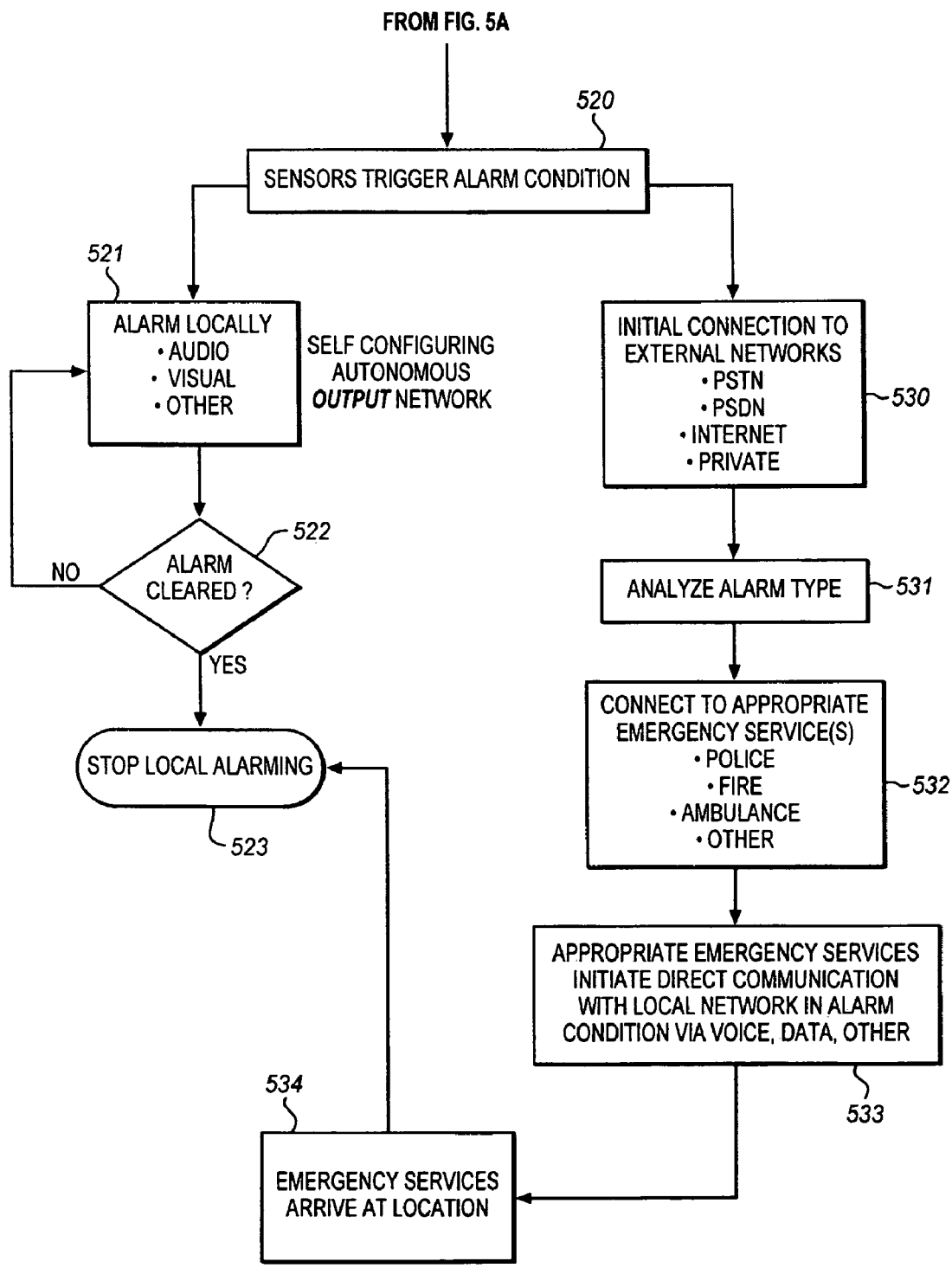
FIG. 5B illustrates, in flow diagram form, the Output Network's response to a given alarm condition from the Alarm Network shown in FIG. 5A.

FIG. 5B describes the Output Network's response to a given alarm condition from the alarm network in FIG. 5A. First, although not shown in FIG. 5B, the Output Network 120 goes thru a similar configuration process described in FIG. 5A.

In FIG. 5B at 520, a sensor (FIG. 2A element 201) in an Alarm Network Device, for example 114, detects a hazard condition and signals, communicates this alarm condition to the Output Network, 120. From step 520, two parallel paths are taken, beginning at steps 521 and 530. At step 521, the local Output Network annunciates the alarm via audio, visual or other means. Next at step 522, a check is performed to determine if the alarm condition at 520 has been cleared. If no, the process goes back to step 521 to continue annunciating the alarm condition. If the alarm condition is cleared, the annunciation of the alarm condition is terminated or stopped at step 523.

The second parallel path begins at 530 where the Alarm Network 110 connects to external network(s) via means already described herein. Then, the alarm type is analyzed at 531. This analysis could make determinations such as sense of urgency, which units should respond, what types of units should respond and so on. At step 532, after the alarm analysis is complete at step 531, a communications connection is made to the appropriate Emergency Services responders, for example police, fire, ambulance and/or other. At 533, the selected emergency service responders are in direct communication with the local area where the emergency alarm condition initiated. This communication could be data or voice; it could be mobile or fixed. Step 534 depicts the responders arriving on scene; at this point, and in general, the responder communication link to the local alarming site would be terminated. When the alarm condition is cleared, the alarm condition annunciation would be terminated at step 523. Alternatively, since emergency responders are now on scene, they could make the on-site event management call to terminate the alarm annunciation to enhance response effectiveness.

Alarm and Output Event in the Self-Configuring Alarm System

Figure 6A:
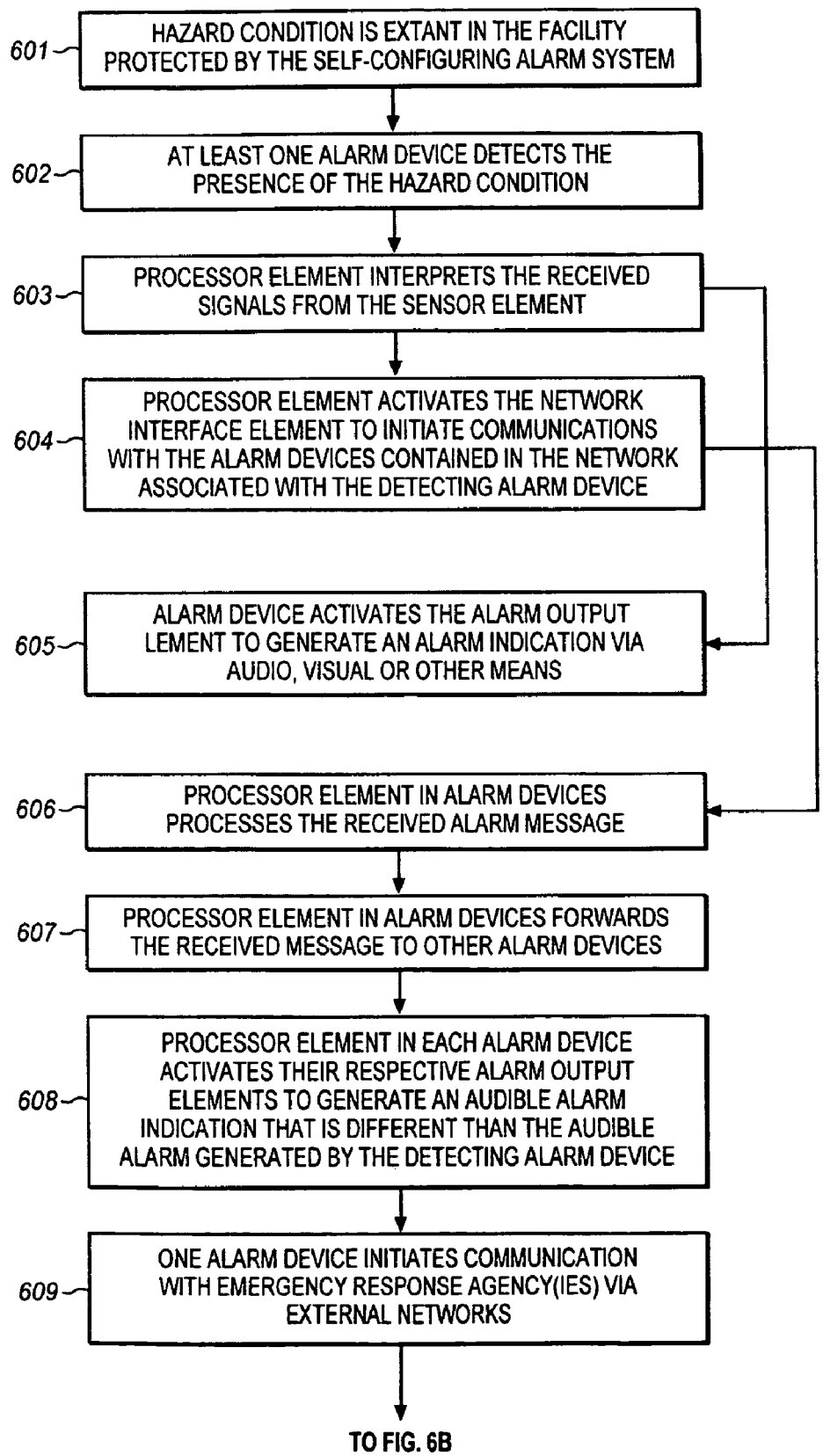

FIGS. 6A and 6B illustrate, in flow diagram form, the operation of the present Self-Configuring Alarm System 100, consisting of a plurality of alarm devices 111-114 in Alarm Device Network 110, in generating alarm indications via the output devices 121-124 in Output Device Network 120, in response to the detection of a hazard condition in a dwelling. In the event that a hazard condition is extant at step 601 in the dwelling protected by the Self-Configuring Alarm System 100, at least one (111) of the alarm devices 111-114 detects the presence of the hazard condition at step 602. The sensor element 201 in the detecting alarm device 111 generates an electrical signal (hazard detection indication) at step 602 indicative of the status of the monitored hazard condition, which electrical signal is received by the processor element 202. The processor element 202 at step 603 interprets the received electrical signal and activates its network interface element 203 at step 604 to initiate communications with the other alarm devices (112, 113 and 114) contained in the Alarm Device Network 110 associated with alarm device 111. The processor element 202 creates a hazard detection indication that indicates the presence and nature of the hazard that is detected by the sensor element 201 and this hazard detection indication is propagated by the network interface element 203 to the alarm devices 112, 113 and 114 that comprise the Alarm Device Network 110 for alarm device 111, as identified in the network self-configuration process described above.

In addition, processor element 202 in alarm device 111 activates the collocated and interconnected output device 121 at step 605 to generate, for example, an audible alarm indication to alert the occupants of the dwelling of the presence of a hazard condition. The audible alarm indication typically would be of sufficient intensity and content to cause the occupants located in the vicinity of the output device 121 to recognize the seriousness of the communication. The audible alarm would also typically be different than the audible alarm generated by other output devices 122-124, so the occupants can discern the locus of the hazard condition simply by the difference in the audible alarms being generated.

The hazard detection indication, when received by the alarm devices 112-114 at step 606 cause the processor element 202 in those alarm devices 112-114 to interpret the hazard detection indication, identify the nature of the communication and then forward the received hazard detection indication to other alarm devices at step 607. In addition, processor element 202 in each of the alarm devices 112-114 activates their respective output devices (if present) at step 608. In addition, the hazard detection indication is transmitted via the Output Device Network 120 to the output devices 121-124. The audible alarm generated by these output devices 122-124 would typically be different than the audible alarm generated by the output device 121 that detected the hazard, so the occupants can discern the locus of the hazard condition simply by the difference in the audible alarms being generated.

As described above, with respect to the propagation of network configuration information and the hazard detection indication from the detecting alarm device 111, the hazard detection indication is automatically propagated among all of the alarm devices 112-114 that are connected by the communication medium 110 by each alarm device communicating with other members of Alarm Device Network 110. In this manner, the alarm devices 111-114 are cooperatively operative on a dynamic message propagation pattern to circulate the hazard detection indication. It is expected that at least one of the alarm devices can also be connected to an external communication medium, such as the Public Switched Telephone Network (PSTN), and the processor element contained in that alarm device can initiate a telephone call or data message to an emergency response agency (such as fire department, police department, private security service and the like) at step 609 to deliver a predetermined message that indicates the identity of the dwelling, the nature of the hazard condition and the locus of the hazard condition in the dwelling. By providing locus specific and hazard specific information to the emergency response agency, their response can be targeted, thereby providing a more effective and timely response to deal with the detected hazard condition.

FIG. 6B illustrates, in flow diagram form, the reverse path or Reverse 911 connection. At step 620, the alarm event type is analyzed and at step 621 the appropriate emergency response agencies are mobilized. At step 622, a Reverse 911 communication is established between the emergency responders and the Output Device Network 120, for example via Firewall 133 connecting further to PSAP Interface 132. At step 623, communications to the Output Device Network 120 are managed from the command headquarters of the emergency responder. This communication type is generally fixed in nature. In contrast, at step 624, the communication mode is mobile in nature from the dispatched teams to the Output Device Network 120. At step 625, via both fixed and mobile communications, aid-assistance via the reverse path is rendered to the occupants of the dwelling via the output devices 121-124 in the Output Device Network 120.

SUMMARY

The self-configuring emergency event alarm network dynamically interconnects the alarm devices that are installed throughout a dwelling, campus, facility or the units of a multiple family dwelling using a self-configuring network. The network of alarm devices, therefore, can spread the alarm indication to the entirety of the area covered by the network of alarm devices and also can differentiate between a general alarm indication and the locus of the alarm event. In addition, the Self-Configuring Alarm System includes a plurality of autonomous output devices which function to provide an audible alarm that directs the occupants to the location of the hazard and/or provides an indication of the nature of the detected hazard or whether an indication of the hazard has been received at a Public Safety Answering Point (PSAP) that serves the dwelling or locale. The alarm networks and output networks may not be coextensive in their coverage areas.

The invention claimed is:

1. A self-configuring emergency event alarm system, comprising:
a plurality of alarm network devices, each of which comprises:
a processor for communicating with said plurality of self-configuring emergency event alarm network devices to dynamically establish a network of said plurality of self-configuring emergency event alarm network devices;
at least one sensor for detecting the presence of a hazard condition, and
an alarm output for generating at least one alarm indication in response to detection of said presence of a hazard condition;
wherein said processor is responsive to a hazard detected by said at least one sensor for communicating via said network of said plurality of self-configuring emergency event alarm network devices to relay said hazard detection to said plurality of self-configuring emergency event alarm network devices; and
network access for interconnecting said self-configuring alarm network to at least one of a Public Safety Answering Point (PSAP) and an emergency response agency.

2. The self-configuring alarm system of claim 1 wherein said network access comprises:
an emergency reporting device, responsive to said hazard detected by said at least one sensor, for forwarding said hazard detection to said at least one of a Public Safety Answering Point (PSAP) and an emergency response agency.

3. The self-configuring alarm system of claim 2 wherein said network access comprises:
a bidirectional communication link for implementing bidirectional communications between said at least one of a Public Safety Answering Point (PSAP) and an emergency response agency and at least one of said plurality of alarm network devices.

4. The self-configuring alarm system of claim 3 wherein said network access further comprises:
an authentication device, responsive to receipt of communications from at least one of said Public Safety Answering Point (PSAP) and said emergency response agency, for verifying an identity of said at least one said Public Safety Answering Point (PSAP) and said emergency response agency.

5. The self-configuring alarm system of claim 3 wherein said network access further comprises:
a response distribution device, responsive to receipt of communications from at least one of a Public Safety Answering Point (PSAP) and an emergency response agency, for distributing said communications to at least one of said alarm network devices for broadcast in human sensible form by said alarm output device.

6. The self-configuring alarm system of claim 5 wherein said alarm output device comprises:
alarm indication generation for generating at least one alarm indication comprising one of: an audible output of predetermined volume, duration, and pattern, a visual indication of predetermined intensity, duration, and pattern, and audible communication received from at least one of a Public Safety Answering Point (PSAP) and an emergency response agency.

7. The self-configuring alarm system of claim 3 wherein said processor further comprises:
a location for storing data indicative of a definable location in which said alarm device is installed; and
a location propagation device, responsive to said hazard detected by said at least one sensor for communicating via said network of said plurality of self-configuring emergency event alarm network devices to relay said data indicative of a definable location in which said alarm device is installed to said plurality of self-configuring emergency event alarm network devices.

8. The self-configuring alarm system of claim 7 wherein said network access comprises:
an emergency reporting device, responsive to said hazard detected by said at least one sensor, for forwarding said hazard detection and said data indicative of a definable location in which said alarm device is installed to said at least one of a Public Safety Answering Point (PSAP) and an emergency response agency.

9. A self-configuring emergency event alarm network, comprising:
a plurality of cooperatively operative alarm network devices wherein each of said alarm network devices comprises:
a network for exchanging messages with one or more of said plurality of alarm network devices;
a processor for communicating with at least one of said plurality of alarm network devices via said network to establish a network of said plurality of alarm network devices;
at least one sensor for detecting the presence of a hazard; and
an alarm output device for generating one or more human sensible alarm indications in response to detection of said presence of a hazard condition;
wherein said processor is responsive to a hazard detected by said at least one sensor for communicating with at least one of said plurality of alarm network devices to relay said hazard detection to said at least one of said plurality of alarm network devices; and
network access for interconnecting said self-configuring alarm network to at least one of a Public Safety Answering Point (PSAP) and an emergency response agency.

10. The self-configuring alarm system of claim 9 wherein said network access comprises:
an emergency reporting device, responsive to said hazard detected by said at least one sensor, for forwarding said hazard detection to said at least one of a Public Safety Answering Point (PSAP) and an emergency response agency.

11. The self-configuring alarm system of claim 10 wherein said network access comprises:
a bidirectional communication link for implementing bidirectional communications between said at least one of a Public Safety Answering Point (PSAP) and an emergency response agency and at least one of said plurality of alarm network devices.

12. The self-configuring alarm system of claim 11 wherein said network access further comprises:
an authentication process, responsive to receipt of communications from at least one of said Public Safety Answering Point (PSAP) and said emergency response agency, for verifying an identity of said at least one said Public Safety Answering Point (PSAP) and said emergency response agency.

13. The self-configuring alarm system of claim 11 wherein said network access further comprises:
a response distribution device, responsive to receipt of communications from at least one of a Public Safety Answering Point (PSAP) and an emergency response agency, for distributing said communications to at least one of said alarm network devices for broadcast in human sensible form by said alarm output device.

14. The self-configuring alarm system of claim 13 wherein said alarm output device comprises:
an alarm indication generation device for generating at least one alarm indication comprising one of: an audible output of predetermined volume, duration, and pattern, a visual indication of predetermined intensity, duration, and pattern, and audible communication received from at least one of a Public Safety Answering Point (PSAP) and an emergency response agency.

15. The self-configuring alarm system of claim 11 wherein said processor further comprises:
a location for storing data indicative of a definable location in which said alarm device is installed; and
a location propagation device, responsive to said hazard detected by said at least one sensor for communicating via said network of said plurality of self-configuring emergency event alarm network devices to relay said data indicative of a definable location in which said alarm device is installed to said plurality of self-configuring emergency event alarm network devices.

16. The self-configuring alarm system of claim 15 wherein said network access comprises:
an emergency reporting device, responsive to said hazard detected by said at least one sensor, for forwarding said hazard detection and said data indicative of a definable location in which said alarm device is installed to said at least one of a Public Safety Answering Point (PSAP) and an emergency response agency.

17. A self-configuring alarm system, comprising:
an alarm device network comprising a plurality of cooperatively operative alarm devices wherein each of said alarm devices comprises:
at least one sensor for detecting the presence of a hazard; and
a processor responsive to a hazard detected by said at least one sensor for communicating with said at least one of said plurality of alarm devices to communicate a hazard detection indication to said at least one of said plurality of alarm devices;
an output device network communicatively connected to said alarm device network and containing a plurality of output devices, wherein each of said output devices comprises:
a receiver for receiving said hazard detection indication;
an output device, responsive to said received hazard detection indication, for generating one or more human sensible alarm indications; and
network access for interconnecting said self-configuring alarm network to at least one of a Public Safety Answering Point (PSAP) and an emergency response agency.

18. The self-configuring alarm system of claim 17 wherein said network access comprises:
an emergency reporting device, responsive to said hazard detected by said at least one sensor, for forwarding said hazard detection to said at least one of a Public Safety Answering Point (PSAP) and an emergency response agency.

19. The self-configuring alarm system of claim 18 wherein said network access comprises:
a bidirectional communication link for implementing bidirectional communications between said at least one of a Public Safety Answering Point (PSAP) and an emergency response agency and at least one of said plurality of alarm network devices.

20. The self-configuring alarm system of claim 19 wherein said network access further comprises:
an authentication process, responsive to receipt of communications from at least one of said Public Safety Answering Point (PSAP) and said emergency response agency, for verifying an identity of said at least one said Public Safety Answering Point (PSAP) and said emergency response agency.

21. The self-configuring alarm system of claim 19 wherein said network access further comprises:
a response distribution device, responsive to receipt of communications from at least one of a Public Safety Answering Point (PSAP) and an emergency response agency, for distributing said communications to at least one of said alarm network devices for broadcast in human sensible form by said alarm output device.

22. The self-configuring alarm system of claim 21 wherein said alarm output device comprises:
an alarm indication generation device for generating at least one alarm indication comprising one of: an audible output of predetermined volume, duration, and pattern, a visual indication of predetermined intensity, duration, and pattern, and audible communication received from at least one of a Public Safety Answering Point (PSAP) and an emergency response agency.

23. The self-configuring alarm system of claim 19 wherein said processor further comprises:
a location for storing data indicative of a definable location in which said alarm device is installed; and
a location propagation device, responsive to said hazard detected by said at least one sensor for communicating via said network of said plurality of self-configuring emergency event alarm network devices to relay said data indicative of a definable location in which said alarm device is installed to said plurality of self-configuring emergency event alarm network devices.

24. The self-configuring alarm system of claim 23 wherein said network access comprises:
an emergency reporting process, responsive to said hazard detected by said at least one sensor, for forwarding said hazard detection and said data indicative of a definable location in which said alarm device is installed to said at least one of a Public Safety Answering Point (PSAP) and an emergency response agency.

25. A self-configuring alarm system, comprising:
at least one alarm device network, wherein each of said at least one alarm device networks comprises a plurality of cooperatively operative alarm devices wherein each of said alarm devices in an alarm device network comprises:
at least one sensor for detecting the presence of a hazard; and
a processor responsive to a hazard detected by said at least one sensor for communicating with said at least one of said plurality of alarm devices in said alarm device to communicate a hazard detection indication to said at least one of said plurality of alarm devices in said alarm device network;
at least one output device network, wherein each of said at least one output device networks are communicatively connected to at least one of said at least one alarm device network and containing a plurality of output devices, wherein each of said output devices in an output device network comprises:

a receiver for receiving said hazard detection indication;

an output device, responsive to said received hazard detection indication, for generating one or more human sensible alarm indications; and network access for interconnecting said self-configuring alarm network to at least one of a Public Safety Answering Point (PSAP) and an emergency response agency.

26. The self-configuring alarm system of claim 25 wherein said network access comprises:

an emergency reporting device, responsive to said hazard detected by said at least one sensor, for forwarding said hazard detection to said at least one of a Public Safety Answering Point (PSAP) and an emergency response agency.

27. The self-configuring alarm system of claim 26 wherein said network access comprises:

a bidirectional communication link for implementing bidirectional communications between said at least one of a Public Safety Answering Point (PSAP) and an emergency response agency and at least one of said plurality of alarm network devices.

28. The self-configuring alarm system of claim 27 wherein said network access further comprises:

an authentication process, responsive to receipt of communications from at least one of said Public Safety Answering Point (PSAP) and said emergency response agency, for verifying an identity of said at least one said Public Safety Answering Point (PSAP) and said emergency response agency.

29. The self-configuring alarm system of claim 27 wherein said network access further comprises:

a response distribution device, responsive to receipt of communications from at least one of a Public Safety Answering Point (PSAP) and an emergency response agency, for distributing said communications to at least one of said alarm network devices for broadcast in human sensible form by said alarm output device.

30. The self-configuring alarm system of claim 29 wherein said alarm output device comprises:

an alarm indication generation device for generating at least one alarm indication comprising one of: an audible output of predetermined volume, duration, and pattern, a visual indication of predetermined intensity, duration, and pattern, and audible communication received from at least one of a Public Safety Answering Point (PSAP) and an emergency response agency.

31. The self-configuring alarm system of claim 27 wherein said processor further comprises:

a location for storing data indicative of a definable location in which said alarm device is installed; and a location propagation device, responsive to said hazard detected by said at least one sensor for communicating via said network of said plurality of self-configuring emergency event alarm network devices to relay said data indicative of a definable location in which said alarm device is installed to said plurality of self-configuring emergency event alarm network devices.

32. The self-configuring alarm system of claim 31 wherein said network access comprises:

an emergency reporting device, responsive to said hazard detected by said at least one sensor, for forwarding said hazard detection and said data indicative of a definable location in which said alarm device is installed to said at least one of a Public Safety Answering Point (PSAP) and an emergency response agency.

33. A self-configuring alarm system, comprising:

an alarm device network comprising a plurality of cooperatively operative alarm devices wherein at least one of said alarm devices comprises:

an autonomous network configuring device for communicating with at least one of said plurality of alarm devices to autonomously establish a network of said plurality of alarm devices;

an output device network containing a plurality of output devices, wherein each of said output devices is responsive to a received alarm indication, for generating one or more human sensible alarm indications;

a communication medium connected to said alarm device network and said output device network for exchanging communications signals therebetween; and network access for interconnecting said alarm network to at least one of a Public Safety Answering Point (PSAP) and an emergency response agency.

34. The self-configuring alarm system of claim 33 wherein said network access comprises:

an emergency reporting device, responsive to said hazard detected by said at least one sensor, for forwarding said hazard detection to said at least one of a Public Safety Answering Point (PSAP) and an emergency response agency.

35. The self-configuring alarm system of claim 34 wherein said network access comprises:

a bidirectional communication link for implementing bidirectional communications between said at least one of a Public Safety Answering Point (PSAP) and an emergency response agency and at least one of said plurality of alarm network devices.

36. The self-configuring alarm system of claim 35 wherein said network access further comprises:

an authentication process, responsive to receipt of communications from at least one of said Public Safety Answering Point (PSAP) and said emergency response agency, for verifying an identity of said at least one said Public Safety Answering Point (PSAP) and said emergency response agency.

37. The self-configuring alarm system of claim 35 wherein said network access further comprises:

a response distribution process, responsive to receipt of communications from at least one of a Public Safety Answering Point (PSAP) and an emergency response agency, for distributing said communications to at least one of said alarm network devices for broadcast in human sensible form by said alarm output device.

38. The self-configuring alarm system of claim 37 wherein said alarm output device comprises:

an alarm indication generation device for generating at least one alarm indication comprising one of: an audible output of predetermined volume, duration, and pattern, a visual indication of predetermined intensity, duration, and pattern, and audible communication received from at least one of a Public Safety Answering Point (PSAP) and an emergency response agency.

39. The self-configuring alarm system of claim 35 wherein said processor further comprises:
   a location for storing data indicative of a definable location in which said alarm device is installed; and
   a location propagation device, responsive to said hazard detected by said at least one sensor for communicating via said network of said plurality of self-configuring emergency event alarm network devices to relay said data indicative of a definable location in which said alarm device is installed to said plurality of self-configuring emergency event alarm network devices.

40. The self-configuring alarm system of claim 39 wherein said network access comprises:
   an emergency reporting device, responsive to said hazard detected by said at least one sensor, for forwarding said hazard detection and said data indicative of a definable location in which said alarm device is installed to said at least one of a Public Safety Answering Point (PSAP) and an emergency response agency.

* * * * *